United States Patent
Nemecek et al.

[11] Patent Number: 6,163,395
[45] Date of Patent: Dec. 19, 2000

[54] LINEAR MULTI-OUTPUT OPTICAL TRANSMITTER SYSTEM

[75] Inventors: Joseph E. Nemecek, Worcester; Michael J. Noonan, Shrewsbury; Amaresh Mahapatra, Acton, all of Mass.

[73] Assignee: Fiber Optics Network Solutions Corp., Northboro, Mass.

[21] Appl. No.: 08/913,042

[22] PCT Filed: Mar. 6, 1996

[86] PCT No.: PCT/US96/03199

§ 371 Date: Mar. 12, 1998

§ 102(e) Date: Mar. 12, 1998

[87] PCT Pub. No.: WO96/28936

PCT Pub. Date: Sep. 19, 1996

(Under 37 CFR 1.47)

Related U.S. Application Data

[63] Continuation-in-part of application No. 08/563,678, Nov. 28, 1995, Pat. No. 5,710,653, which is a continuation-in-part of application No. 08/398,987, Mar. 6, 1995, Pat. No. 5,875,048.

[51] Int. Cl.[7] .................................................. H04B 10/02
[52] U.S. Cl. ......................... 359/187; 359/161; 359/180
[58] Field of Search .......................... 359/187, 124–125, 359/127, 130, 132–133, 126, 180, 181, 161

[56] References Cited

U.S. PATENT DOCUMENTS

| | | | |
|---|---|---|---|
| 3,952,260 | 4/1976 | Prochazka et al. | 330/149 |
| 4,244,045 | 1/1981 | Nosu et al. | 370/3 |
| 4,658,394 | 4/1987 | Cheng et al. | 370/3 |
| 4,715,027 | 12/1987 | Mahapatra et al. | 370/3 |
| 4,768,849 | 9/1988 | Hicks, Jr. | 350/96.15 |
| 4,775,971 | 10/1988 | Bergmann | 359/124 |
| 4,959,826 | 9/1990 | Smith | 370/1 |
| 5,002,353 | 3/1991 | Johnson | 350/96.14 |
| 5,005,935 | 4/1991 | Kunikane et al. | 350/96.16 |
| 5,031,235 | 7/1991 | Raskin et al. | 455/612 |
| 5,107,360 | 4/1992 | Huber | 359/124 |
| 5,109,441 | 4/1992 | Glaab | 385/1 |
| 5,119,447 | 6/1992 | Trisno | 385/3 |
| 5,148,503 | 9/1992 | Skeie | 385/3 |
| 5,157,744 | 10/1992 | Korotky | 385/2 |
| 5,161,044 | 11/1992 | Nazarathy et al. | 359/157 |
| 5,161,206 | 11/1992 | Djupsjbacka | 385/2 |
| 5,168,534 | 12/1992 | McBrien et al. | 385/3 |
| 5,199,086 | 3/1993 | Johnson et al. | 385/2 |

(List continued on next page.)

FOREIGN PATENT DOCUMENTS

| | | |
|---|---|---|
| 164170 | 12/1985 | European Pat. Off. . |
| 0242802A2 | 10/1987 | European Pat. Off. . |
| 0251748 | 1/1988 | European Pat. Off. . |
| 0475331A2 | 3/1992 | European Pat. Off. . |
| 55093338 | 7/1980 | Japan . |
| 2011611 | 7/1979 | United Kingdom . |
| 91/06882 | 5/1991 | WIPO . |
| 96/13104 | 5/1996 | WIPO . |

OTHER PUBLICATIONS

Korotky, S. K., and Ridder, R. M., "Dual Parallel Modulation Schemes for Low–Distortion Analog Optical Transmission," *J. on Selected Areas in Communications*, 8(7):1377–1380 (Sep., 1990).

(List continued on next page.)

*Primary Examiner*—Leslie Pascal
*Attorney, Agent, or Firm*—Hamilton, Brook, Smith & Reynolds, P.C.

[57] ABSTRACT

A high fidelity, multi-output optical transmission system is configured utilizing a high power continuous wave YAG laser, multiport splitters, and linearized external modulation. An electro-optical modulator design in combination with a continuous wave laser, power splits and couplers attains a multi-octave bandwidth transmitter possessing improved second and third order distortion characteristics. The system includes multiple individually modulated transmitter outputs which effectively provides bandwidth multiplication with full redundancy for increased transmission reliability.

18 Claims, 16 Drawing Sheets

U.S. PATENT DOCUMENTS

| | | | |
|---|---|---|---|
| 5,210,633 | 5/1993 | Trisno | 359/194 |
| 5,222,089 | 6/1993 | Huber | 372/26 |
| 5,230,028 | 7/1993 | Lin et al. | 385/3 |
| 5,239,401 | 8/1993 | Olshansky | 359/188 |
| 5,249,243 | 9/1993 | Skeie | 385/3 |
| 5,278,923 | 1/1994 | Nazarathy et al. | 385/3 |
| 5,289,550 | 2/1994 | Plastow | 385/9 |
| 5,293,545 | 3/1994 | Huber | 359/161 |
| 5,309,532 | 5/1994 | Chang et al. | 385/3 |
| 5,321,543 | 6/1994 | Huber | 359/187 |
| 5,327,279 | 7/1994 | Farina et al. | 359/180 |
| 5,361,156 | 11/1994 | Pidgeon | 359/161 |
| 5,373,389 | 12/1994 | Huber | 359/195 |
| 5,400,166 | 3/1995 | Huber | 359/173 |
| 5,473,460 | 12/1995 | Haner et al. | 359/180 |
| 5,488,503 | 1/1996 | Schaffner et al. | 359/187 |
| 5,504,609 | 4/1996 | Alexander et al. | 359/125 |
| 5,526,155 | 6/1996 | Knox et al. | 359/130 |
| 5,557,439 | 9/1996 | Alexander et al. | 359/130 |
| 5,583,683 | 12/1996 | Scobey | 359/127 |
| 5,710,653 | 1/1998 | Nemecek et al. | 359/187 |
| 5,875,048 | 2/1999 | Nemecek et al. | 359/187 |

OTHER PUBLICATIONS

Brooks, J. L., et al., "Implementation and Evaluation of a Dual Parallel Linearization System for AM–SCM Video Transmission," *J. Lightwave Technology*, 11(1):34–41 (Jan., 1993).

Betts, G. E., "Linearized Modulator for Suboctave–Bandpass Optical Analog Links," *IEEE, Trans. MTT*, pp. 1–27 (Dec., 1994).

Farwell, M. L., et al., "Increased Linear Dynamic Range by Low Biasing the Mach–Zehnder Modulator," *IEEE Photonics Technology Letters*, 5(7):779–782 (Jul., 1993).

Johnson, L. M., and Roussell, H. V., "Reduction of Intermodulation Distortion in Interferometric Optical Modulators," *Optics Letters*, 13:928–930 (Oct., 1988).

Chang, W. S. C., "Analog Modulation with Large Linear Dynamic Range" Final Report 1991–92 for MICRO Project #91–020, Univ. of California at San Diego, LaJolla, CA.

Gopalakrishnan, G. K., et al., "A $LiNbO_3$ Microwave–Optoelectronic Mixer with Linear Performance," *IEEE MTT–S Digest*, pp. 1055–1058 (1993).

Skeie, H., and Johnson, R. V., "Linearization of Electro–Optic Modulators By a Cascade Coupling of Phase Modulating Electrodes," *Integrated Optical Circuits*, SPIE vol. 1583, pp. 153–164 (1991).

Izutsu, M., et al., "Picosecond Signal Sampling and Multiplication By Using Integrated Tandem Light Modulators," *J. of Lightwave Technology*, 1(1):285–289 (Mar., 1983).

"Fiber–Optic CATV Transmitter," sales brochure ALY–7832–01, (2 pages), AEL Industries, Inc.

Fiber–Optic CATV Transmitter, sales brochures ALY–7832–03, (2 pages), AEL Industries, Inc.

"Increase Your System Capacity with AELINK Laser Transmission Products," sales brochure, AEL Industries, Inc. (1 page), (1995).

"Fiber–Optic CATV Transmitter," sales brochure ALY–7832–04, (2 pages), AEL Industries, Inc.

"High–Performance Optical Links for the Cable and Cellular Industries," sales brochure, (4 pages), AEL Industries, Inc. (Nov., 1994).

Childs, R. B., and O'Byrne, V. A., "Multichannel AM Video Transmission Using a High–Power Nd: YAG Laser and Linearized External Modulator," *IEEE Journal on Selected Areas in Communications*, vol. 8, No. 7:1369–1376 (Sep., 1990).

Prochazka, A., et al., "Amplifier Linearization by Complementary Pre– or Post–Distortion*," *IEEE Transactions on Cable Television*, vol. CATV–1, No. 1:31–39 (Oct., 1976).

Lotsch, H. K. V., "Theory of Nonlinear Distortion Produced in a Semiconductor Diode," *IEEE Transactions on Electron Devices*, vol. ED–15, No. 5:294–307 (May, 1968).

Buckley, R. H., et al., "A Rugged Twenty Kilometer Fiber Optic Link for 2 to 18 Gigahertz Communications," Proceedings of the International Society for Optical Engineering, vol. 1371 (1990).

Yurek, A. M., et al., "Communical $LINBO_3$ Integrated Optics Devices," *Optics & Photonics News*, pp. 26–30, (Jun., 1995).

Ishii, Y. and Tsukamoto, K., "Coherent Fiber–Optic Microcellular Radio Communication System Using a Novel RF–to–Optic Conversion Scheme," *IEEE Transactions on Microwave Theory and Techniques*, vol. 43, No. 9 (Sep., 1995).

Tan, H. H., "CATV Distribution Over an Optical Fiber with a Linearized Mach Zehnder Modulator and RIN Reduced Laser," Cable TV Sessions, Proceedings of the International Television Symposium and Technical Exhibition, pp. 91–96 (Jun. 13–18, 1991).

Nazarathy, Moshe, et al., "Structured Architectures for CATV Distribution with Externally Modulated Solid State Laser Transmitters," Proceedings from Eleven Technical Sessions of the Annual Convention and Exposition of the National Cable Television Assoc., pp. 365–367 (Jun. 6–9, 1993).

Willems, F. W., et al., "Harmonic Distortion Caused by Stimulated Brillouin Scattering Suppression in Externally Modulated Lightwave AM–CATV Systems," *Electronics Letters*, pp. 343–345 (Feb. 17, 1994).

Willems, F. W., et al., "Simultaneous Suppression of Stimulated Brillouin Scattering and Interferometric Noise in Externally Modulated Lightwave AM–SCM Systems," *IEEE Photonics Technology Letters*, pp. 1476–1478 (Dec., 1994).

Tsubokawa, M., et al., "Suppression of Stimulated Brillouin Scattering in a Single–Mode Fibre by an Acousto–Optic Modulator," *Electronics Letters*, pp. 473–475 (Apr. 24, 1986).

Ohkawa, N. and Hayashi, Y., "Reduction of Bit Error Rate Performance Deterioration Caused by Stimulated Brillouin Scattering in High–Power CPFSK Coherent Optical Transmission Systems," *Electronics Letters*, pp. 515–516 (Mar. 17, 1994).

Sano, A., et al., "10 Gbit/s, 300km Repeaterless Transmission with SBS Suppression by the Use of the RZ Format," *Electronics Letters*, pp. 1694–1695 (Sep. 29, 1994).

LINEAR MULTI-OUTPUT OPTICAL TRANSMITTER SYSTEM

RELATED APPLICATION

This application is a continuation-in-part of U.S. Application No. 08/563,678 filed Nov. 28, 1995 now U.S. Pat. No. 5,710,653, which is a continuation-in-part of U.S. application No. 08/398,987 filed Mar. 6, 1995 now U.S. Pat. No. 5,875,049, both of which are incorporated herein by reference in their entirety.

BACKGROUND OF THE INVENTION

The cable television (CATV) industry currently transmits video signals over networks which combine fiber optic transmission and coaxial cable. In the typical network architecture, baseband video signals from a number of sources are combined into specific RF frequencies as amplitude modulated vestigial sideband video subcarriers (AM-VSB) and then modulated onto a laser transmitter located at a headend. The fiber optic transmission systems employed for CATV applications today use internally modulated diode lasers. The internal modulation varies the drive current to the diode laser to produce approximately 10 mW of output power. Typically, the 10 mW output is then optically split into three or four outputs and distributed on fiber into the cable feeder plant to three or four nodes as shown in FIG. 1. Each node converts the optical signal to an electrical signal which is then further distributed over a standard tree and branch coaxial cable network to reach approximately 500 homes per node. This network architecture effectively divides the bandwidth of a single laser transmitter between 1500 to 2000 homes, thus limiting the bandwidth per home.

Increased demand for bandwidth to provide new services such as enhanced pay per view, interactive video, and video on demand requires a larger number of channels per node. A desirable network architecture would include the following characteristics:

low cost per home ability to address target markets ability to be configured for two-way interactive video services high reliability A continuing need exists for further improvements in fiber optic transmission systems that will accommodate these various objectives.

SUMMARY OF THE INVENTION

A fully interactive architecture with the ability to target each individual subscriber may require at least one dedicated video channel per subscriber. One could use a dedicated 2 mW internally modulated laser transmitter, but this would increase the cost per subscriber since the number of internally modulated 2 mW lasers necessary to accommodate larger bandwidths is prohibitively expensive. The present invention provides a linear multi-output optical transmitter system having multi-octave bandwidth multiplication. The solution provided by the present invention allows the full bandwidth to be transmitted so that bandwidth per subscriber is increased. The system takes advantage of optical splitting of a high energy source, external modulation, predistortion, and multi-chip fabrication techniques to provide multiple transmitters having minimized second and third order distortion characteristics for use in fiber optic communication systems such as personal communication networks, telephone systems, computer and/or interactive communication networks and cable television.

The approach to the modulation scheme for the present invention is to minimize distortion over a wide bandwidth while providing multiple transmission systems. To minimize the second and third order distortion products, the invention employs a multi-chip module arrangement comprising dual parallel traveling wave Mach-Zehnder interferometers. The dual parallel Mach-Zehnder modulators are combined with a co-located multi-chip electronic driver circuit having a feed-forward amplifier design which provides pre-distortion shaping to minimize the second and third order distortion residue and enhance performance.

Accordingly, an optical transmission system having reduced second and third order distortion products is provided which includes a continuous wave laser source, having an output power range between about 50 and 500 mW, and preferably in a range between about 100 and 350 mW, (e.g., a 300 mW YAG laser), for producing an optical carrier signal, an optical splitter coupled to the laser source for splitting the optical carrier signal to a plurality of splitter outputs, and a plurality of transmitters coupled to respective splitter outputs. The high power laser source can also include an optical amplifier to provide an optical output within the desired range above at least 100 mW and preferably over 200 mW. Optical amplifiers operating at either about 1320 nm or about 1550 nm can also be used at remote nodes to amplify the signal over longer distances.

Each transmitter includes a modulator driver, primary and secondary external modulators, and a combiner formed on a single lithium niobate substrate. In the preferred embodiment, the primary and secondary external modulators are Mach-Zehnder modulators. The modulator driver produces primary and secondary driver signals wherein the primary driver signal is scaled and inverted to produce the secondary driver signal. The primary external modulator receives a first portion of the optical carrier signal and modulates the carrier with the primary driver signal to produce a first modulated signal. The secondary external modulator receives a second portion of the optical carrier signal and modulates the carrier with the secondary driver signal to produce a second modulated signal. The combiner superimposes the first modulated signal and the second modulated signal to produce a linearized transmitter output signal.

According to another aspect of the invention, the system further comprises a second continuous wave laser source and an optical switch for switching between the active laser source and the second laser source which can serve as a standby system.

According to a further aspect of the present invention, the modulator driver produces the primary and secondary driver signals according to a predistortion function to compensate for second order products produced by the external modulators.

According to still another aspect of the invention, the system further comprises a ratio detector coupled to the combiner output for detecting second and third order distortion products and for generating correction signals to compensate for such distortion products.

According to yet another aspect of the invention, a transmitter comprising an external modulator and a modulation driver having a distortion network for predistorting a driver signal includes a supervisory signal coupled to a bias input of the modulator. First and second correction circuits coupled to a monitoring optical receiver generate first and second error signals indicative of even and odd distortion respectively in the modulator by monitoring distortion of the supervisory signal. The first error signal is coupled to the modulator bias input to maintain bias about an optical bias point. The second error signal is coupled to a bias processor for adjusting the nonlinear distortion of the distortion network.

The above and other features and advantages of the invention, including various novel details of construction and combinations of parts, will now be more particularly described with reference to the accompanying drawings and pointed out in the claims. It will be understood that the particular optical transmitter system embodying the invention is shown by way of illustration and not as a limitation of the invention.

BRIEF SUMMARY OF THE DRAWINGS

FIG. 17b is a side view of the module of FIG. 17a.

DETAILED DESCRIPTION OF THE INVENTION

The present invention provides a linear multi-output optical transmitter system having multi-octave bandwidth multiplication. The system takes advantage of optical splitting, external modulation, predistortion, and multi-chip fabrication techniques to provide multiple transmitters having minimized second and third order distortion characteristics.

Figure 2A:
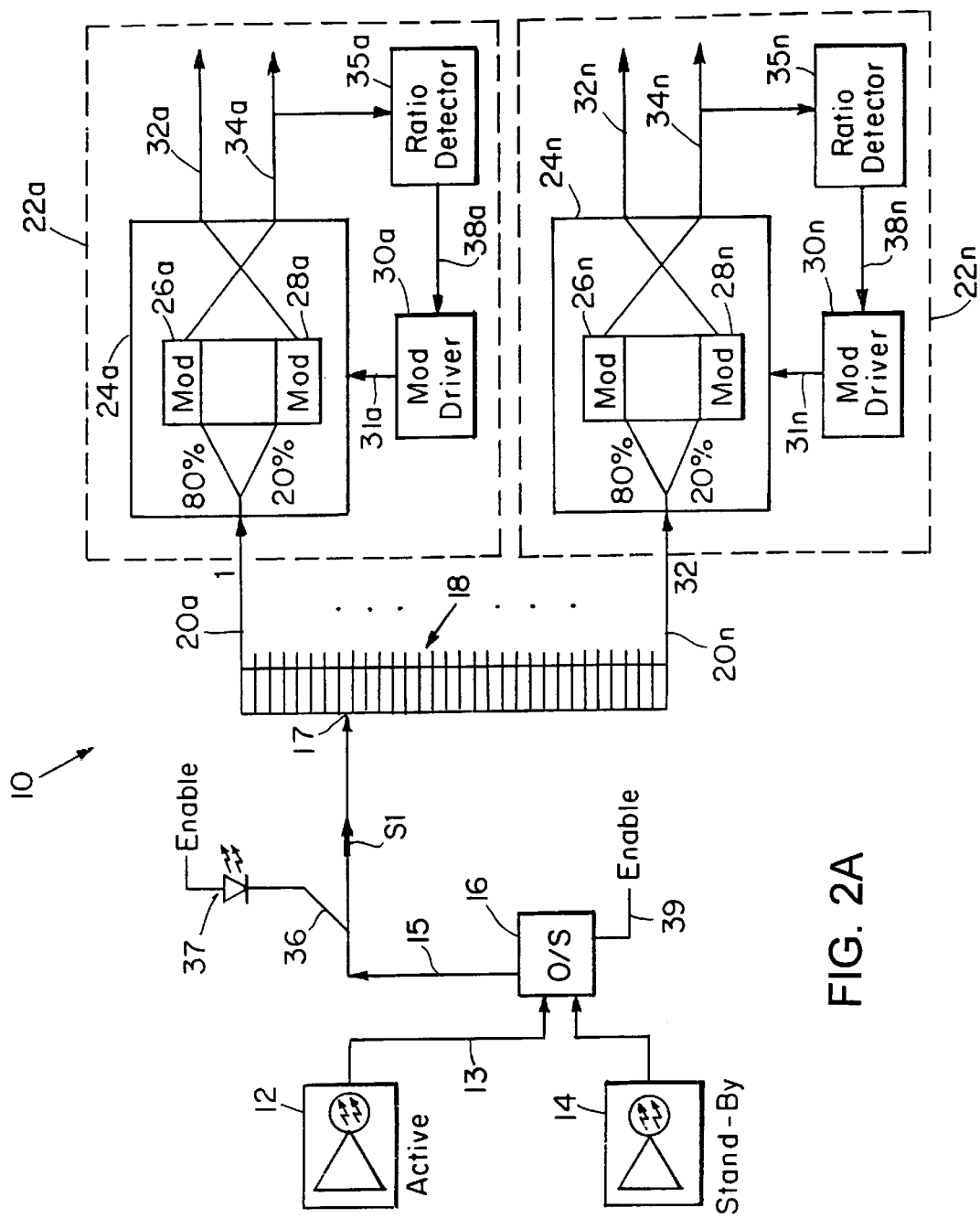
FIG. 2A is a schematic block diagram of a preferred embodiment of the present invention.

Referring to FIG. 2A, a preferred embodiment of the present invention is shown. A continuous wave (cw) laser source 12 is coupled through an optical switch 16 to an input 17 of an optical divider splitter 18. The optical splitter 18 is a 1×N polarization maintaining planar optical waveguide, configured in the preferred embodiment to provide N=32 individual outputs. In other embodiments, N=16 or another number depending on the particular application. For N=32, the 1 through 32 outputs 20a–20n are coupled to individually modulated transmitters 22a–22n. The transmitters 22a–22n provide dual outputs 32a, 34a through 32n, 34n for a total of 32 dual channels or 64 individual outputs. Thus, the system 10 can split and modulate an optical carrier signal S1 of the single cw laser source 12 to serve up to 64 downstream receiver nodes.

A standby cw laser source 14 is optically coupled to the optical switch 16 to provide a standby laser source for the system. Each of the cw laser sources 12 and 14 is preferably a 300 mW yttrium aluminum garnet (YAG) laser. The optical signal on line 15 is monitored by a photo detector 37 coupled through line 36. In the event the power from the active laser source 12 falls below a minimum threshold level, the optical switch 16 will be activated via an enable signal 39 to switch the standby laser source 14 into service on line 15.

The transmitter 22a includes an external modulation block 24a, an RF modulator driver block 30a, and a ratio detector 35a, each of which is described further below. The external modulation block 24a includes dual external modulators 26a, 28a in a parallel configuration. The external modulators 26a, 28a are driven in parallel by the RF modulator driver block 30a. The ratio detector 35a detects distortion products and produces correction signals in response thereto which are input to the RF modulator driver block 30a.

Figure 2B:
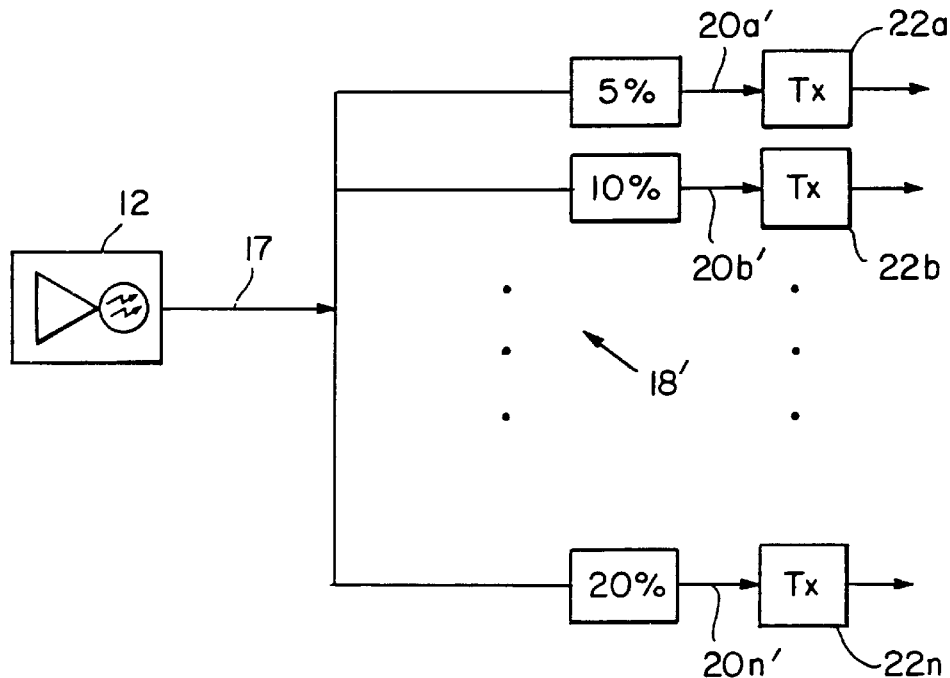
FIG. 2B is a block diagram of an unequal power splitter arrangement for use in the system of FIG. 2A.

The optical splitter 18 provides an equal power split among the N individual outputs 20a–20n. A CATV network architecture can have different path loss budgets across the individual transmission paths leading to the network nodes. The system of the present invention can be configured to provide a range of unequal power outputs. In one embodiment, the optical splitter 18 is replaced with an unequal power splitter 18' shown in FIG. 2B.

The splitter 18' can have a combination of different percentage split ratios for coupling larger or smaller percentages of optical power from laser source 12 to the transmitters 22a–22n. For example, splitter output 20a' can receive 5% of the optical power, output 20b' can receive 10%, and output 20n' can receive 20% of the output power. The remaining outputs can receive power according to still different percentage split ratios. These percentages are given by example and in no way are meant to limit the invention.

Figure 2C:
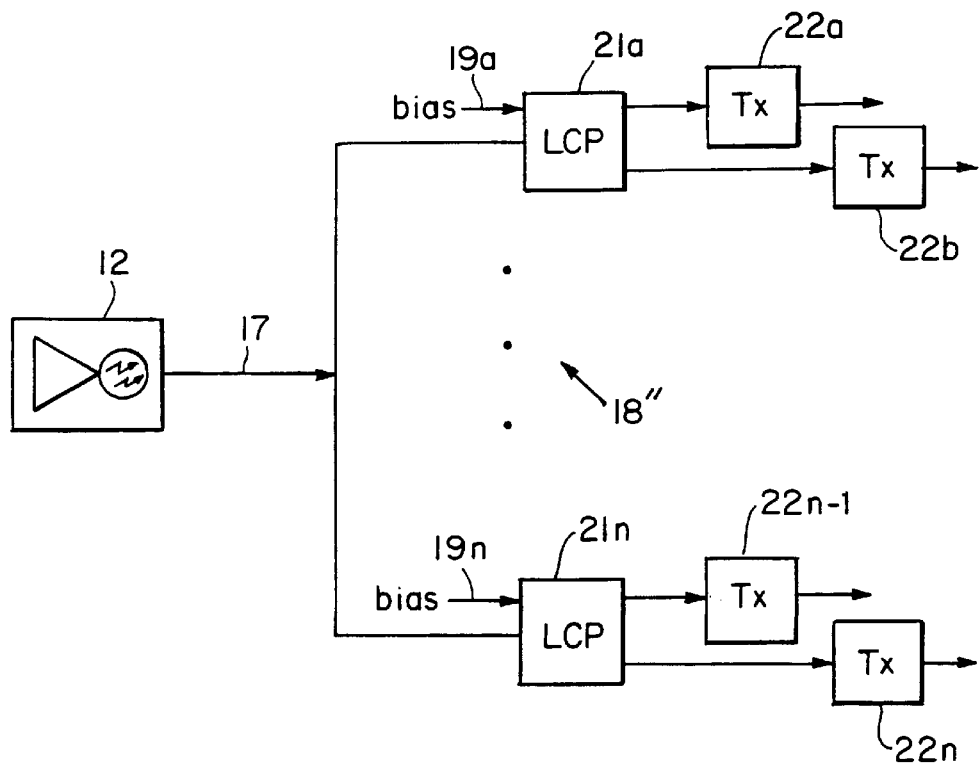
FIG. 2C is a block diagram of a variable power splitter arrangement wherein liquid crystal polarizers are used.

In another approach, an electronic power controller is used to provide variable power to multiple transmitters. The electronic power controller can be a twisted nematic liquid crystal polarizer which includes a bias control for varying the polarization in combination with a prism. FIG. 2C shows a system of the present invention having a variable splitter arrangement 18" which includes liquid crystal polarizers 21a–21n coupled to the output 17 of laser source 12. The liquid crystal polarizers include bias controls 19a–19n which can be coupled to a microcontroller to control the power split to transmitters 22 coupled to the output. With this arrangement, the polarizer split ratios can be remotely programmed to values which provide the required power for a given network distribution layout. The twisted nematic liquid crystal polarizers 21a–21n can be, for example, of the type disclosed in U.S. Pat. No. 4,917,452, the contents of which are incorporated herein by reference.

Figure 1:
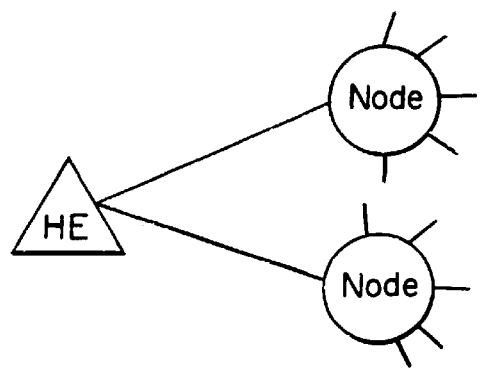
FIG. 1 is a representation of a prior art CATV distribution arrangement.
Figure 3:
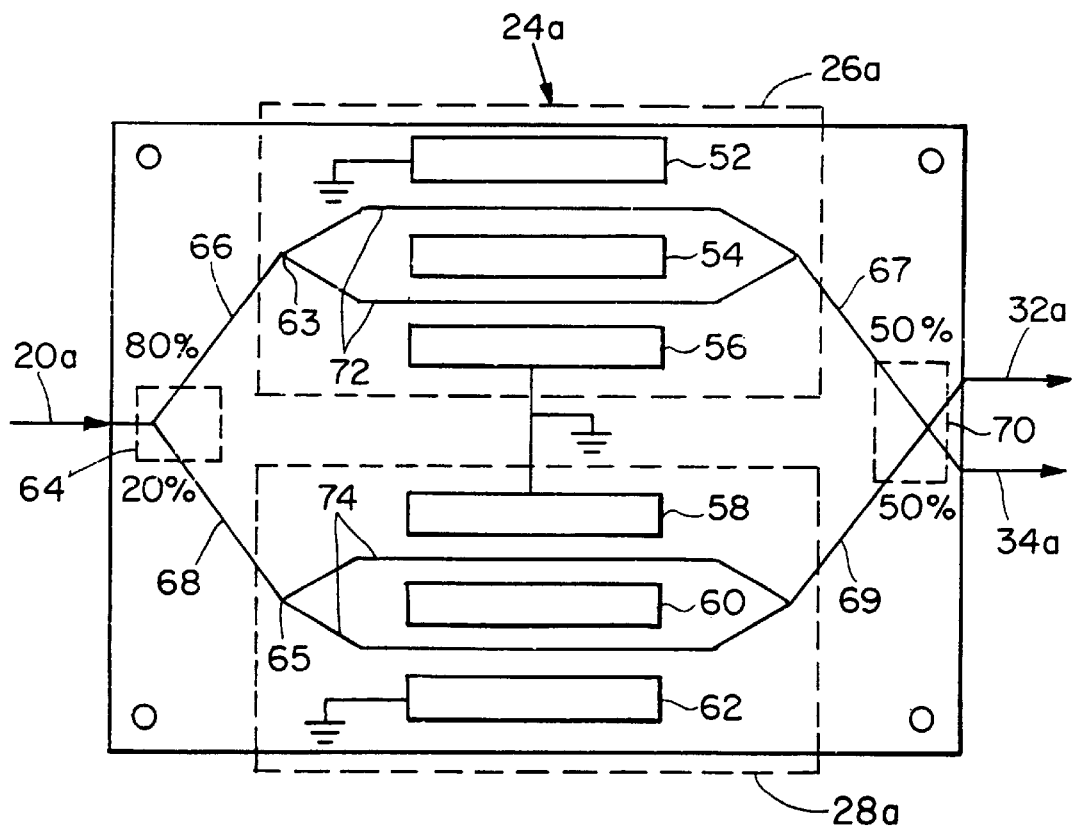
FIG. 3 is a block diagram of the external modulation block of the system in FIG. 2A.

Referring to FIG. 3, the external modulation block 24a is shown in more detail. An optical carrier signal on output path 20a from optical splitter 18 (FIG. 2A) is coupled to a proportional coupler 64 which splits the optical signal proportionally onto paths 66 and 68 such that path 66 carries 80% of the signal and path 68 receives 20%. The proportional outputs on paths 66, 68 are respectively coupled to inputs 63, 65 of the dual external modulators 26a, 28a.

The dual external modulators 26a, 28a are preferably Mach-Zehnder interferometers. External modulator 26a has an individual control portion which includes a center electrode 54 and outer electrodes 52, 56. Dual waveguides 72 of external modulator 26a extend in the spaces between the electrodes. External modulator 28a is similarly configured with center electrode 60, outer electrodes 58, 62 and dual waveguides 74. The outer electrodes 52, 56, 58, 62 of the external modulators are connected to ground potential. The center electrode 54 of external modulator 26a is connected to a main driver signal from RF modulator driver block 30a (FIG. 2A). The center electrode 60 of external modulator 28a is connected to a scaled and inverted driver signal from RF modulator driver block 30a (FIG. 2A). The modulated outputs 67, 69 of the respective Mach-Zehnder modulators 26a, 28a are superimposed at a combiner 70 to produce resultant dual outputs 32a, 34a.

Prior work on external modulation has been focused on single octave bandwidth and special applications at a single frequency. Recently there has been work on using dual modulators focused on noise figure in a sub-octave bandwidth, series modulator configuration, where second order distortion is not a problem and signal to noise improvement is addressed.

The approach of dual parallel modulation is described in Korotky et al., "Dual Parallel Modulation Schemes for Low-Distortion Analog Optical Transmission", IEEE Journal on Selected Areas in Communications, Vol. 8, No. 7, September 1990. Dual parallel modulation achieves linearization by using the distortion created by a secondary modulator to cancel the distortion produced by a primary modulator. The present invention improves upon the known dual parallel linearization schemes by providing coherent dual parallel linearization without requiring additional phase modulation in either of the two modulator output paths to maintain quadrature between the primary and secondary modulator signals.

Figure 4A:
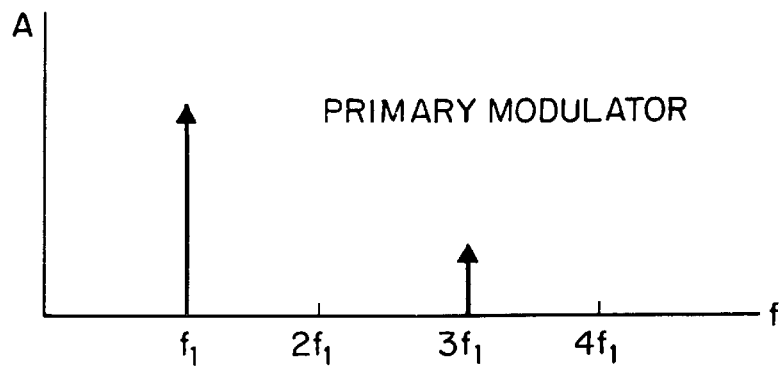
FIGS. 4a–4c are graphs schematically illustrating the distortion cancellation achieved by the external modulation block in FIG. 3.
Figure 4B:
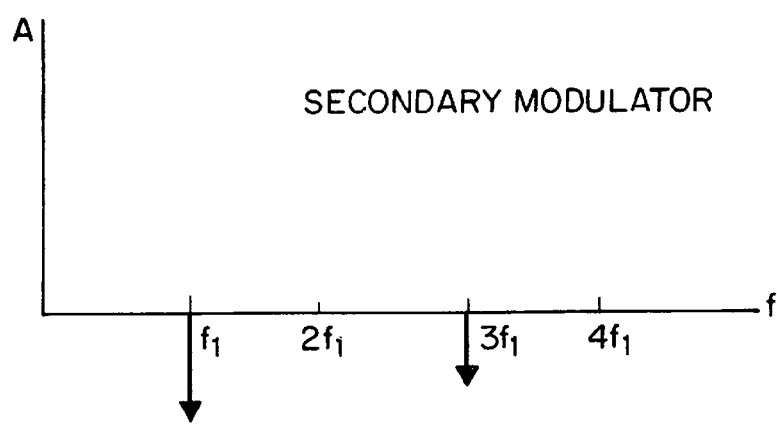
Figure 4C:
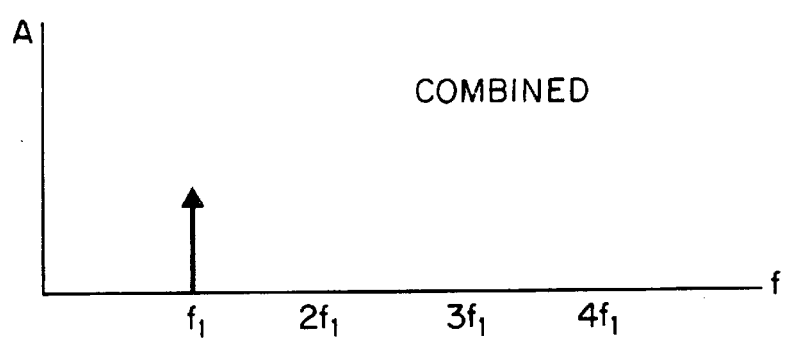

In the preferred embodiment, external modulators 26a, 28a function respectively as the primary and secondary modulators to achieve cancellation of the third order components in the modulated optical signal produced on the outputs 32a, 34a as shown in FIGS. 4a–4c. Although the fundamental suffers a small loss of power, this is a practical implementation. The need for additional phase modulation in either of the two modulator output paths to maintain quadrature between the primary and secondary modulator signals is eliminated in the scheme of the present invention by the processing technique utilized to fabricate a single lithium niobate die having very controlled photolithographic processes and diffusion. The process of annealing this multichip die at low temperatures in a wet oxygen bath subsequent to an initial titanium diffusion phase stabilizes the device. This stabilization process in effect eliminates any changes in phase in an operational environment.

Figure 5:
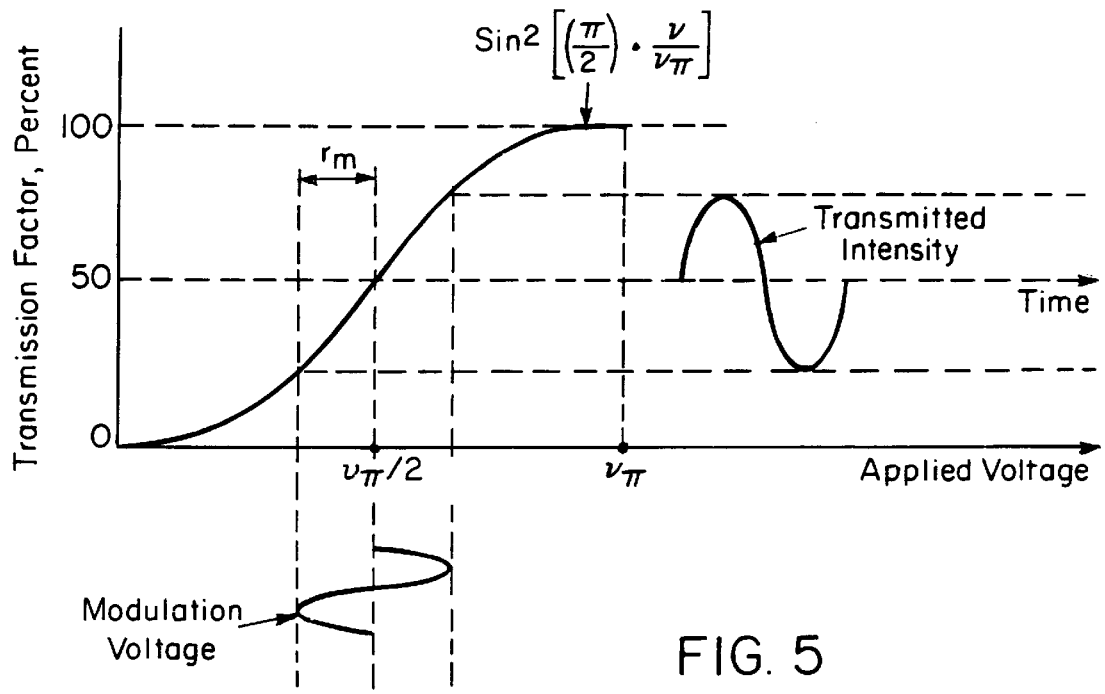
FIG. 5 is a graph schematically illustrating the transfer function of an external modulator.

An external modulator has a sinusoidal transfer function which results in second and third order distortion products in the modulated output signal. The transfer function is illustrated in FIG. 5. Operating such a modulator at a quadrature point, i.e., a DC bias of $\pi/2$, eliminates even-order distortion products. However, in reality, a perfectly symmetrical sine function cannot be achieved. The lack of sine wave symmetry creates second order residue over the operational bandwidth.

The Mach-Zehnder modulators 26a, 28a are each operated at the quadrature point $\pi/2$. Maintaining the modulators 26a, 28a at their respective quadrature points is achieved by the ratio detector 35a in combination with the RF modulator driver block 30a (FIG. 2A). The ratio detector 35a monitors second and third order distortion and creates feedback correction signals to the modulator driver block 30a which in turn repositions the DC bias on the modulation curve, as discussed further below. The ratio detector 35a couples a small portion (e.g., 5%) of the output signal 34a to an optical receiver. The signal detected by the optical receiver is used to generate the feedback correction signals.

The theory of the ratio detector 35a can be understood by first noting that the optical field signal input to the external modulation block 24a varies as:

$$E_{in} = A \cos \omega t$$

$$E_{out} = A\cos\left[\omega t - \frac{\omega}{c}\left(n_o - \frac{n_o^3}{2}rE_m\sin\omega_m t\right)l\right]$$

where l is the optical path length through the lithium niobate crystal.

Rewrite as $$E_{out} = A \cos [\omega t + \delta \sin \omega_m t]$$

where $\delta$ is the phase modulation index, and $$\delta = \frac{\omega n_o^3 rE_m l}{2c} = \frac{\pi n_o^3 rE_m l}{\lambda}$$

using Bessel function identities:

$$\cos (\delta \sin \omega_m t) = J_o(\delta) + 2J_2(\delta)\cos \omega_m t \ldots$$

$$\sin (\delta \sin \omega_m t) = 2J_1(\delta)\sin \omega_m t + 2J_3 (\delta) \sin 3\omega_m t$$

Rewriting:

$$E_{out} = A[J_o(\delta) \cos \omega t + J_1 (\delta) \cos (\omega+\omega_m)t - J_1(\delta) \cos (\omega-\omega_m)t + J_2(\delta) \cos (\omega+2\omega_m)]$$

Detecting the ratio of $J_2/J_1$ and producing a feedback correction signal can compensate for any second order distortion. Additionally, the ratio of $J_3/J_1$ can be used to produce a correction signal to keep the DC bias at $\pi/2$.

Figure 6:
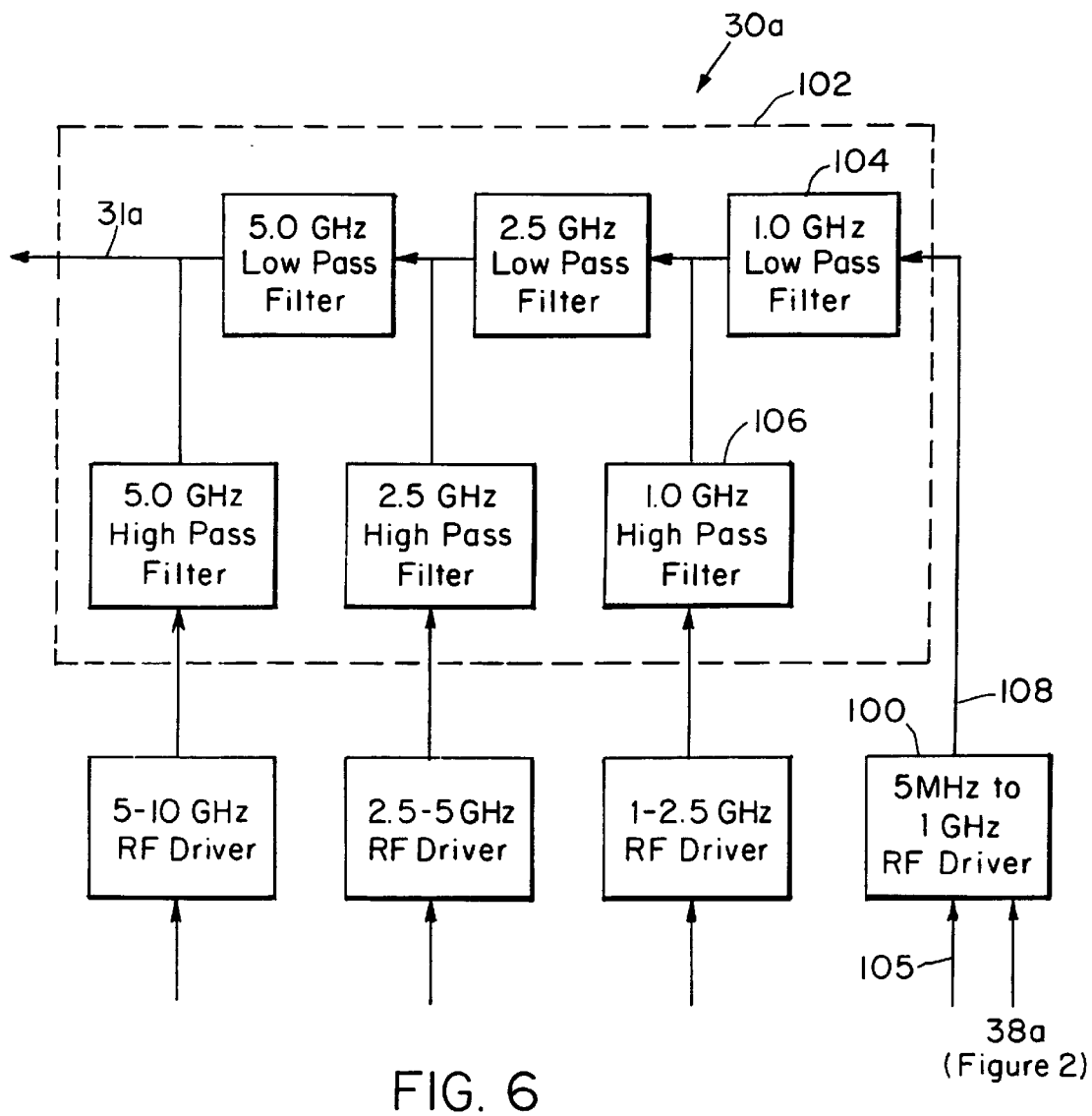
FIG. 6 is a block diagram of the RF modulator driver block of the system in FIG. 2A.

Typical industry standards require that total distortion products in an operational CATV distribution system be maintained below −60 db over the entire bandwidth to meet the fidelity expected by individual subscribers. Factors which limit amplitude modulation over multi-octave bandwidths are noise figure, dynamic range and bandwidth of driver electronics. Since an external optical modulator has a very large modulation bandwidth, multi-chip RF modulator drive circuitry is employed to meet performance over multi-octave bandwidth, as shown in FIG. 6. In order to cover the wide bandwidth possible with the multi-chip modulation scheme, individual RF modulator driver circuits 100 are coupled to a passive broadband equalizer combiner 102. The equalizer combiner 102 in turn drives the optical modulators from a single output 31a. In the preferred embodiment, the individual RF modulator driver circuits 100 are divided into four bands: 5 MHz to 1 GHZ, 1 GHz to 2.5 GHZ, 2.5 GHZ to 5 GHZ, and 5 GHZ to 10 GHz. These bands are noted for example purposes only and not as a limitation on the present invention. The equalizer combiner 102 comprises a configuration of low pass filters 104 in series and high pass filters 106 in parallel.

Figure 7:
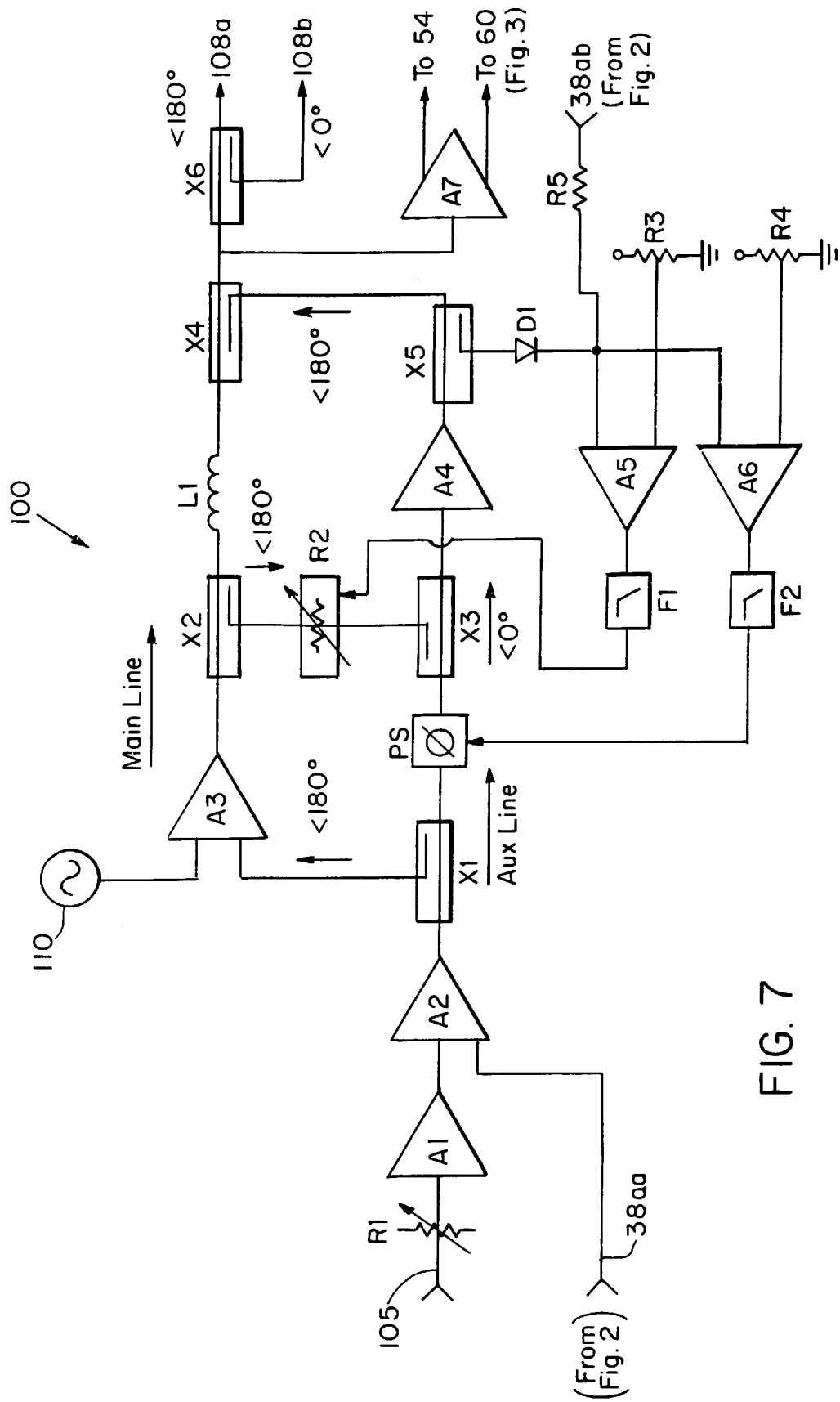
FIG. 7 is a schematic block diagram of an RF modulator driver circuit of the modulator driver block in FIG. 6.

FIG. 7 shows an RF modulator drive circuit 100 of the RF modulator driver block 30a. The RF modulator drive circuit 100 uses feed forward cancellation. Feed forward cancellation inverts a sample of the undistorted input signal and adds it to a signal of a main line amplifier output containing both the input signal and distortion products created within the main line amplifier itself. The resultant output includes the distortion products which are inverted and amplified by a highly linear distortion amplifier A4 and then linearly summed with a main line amplifier output signal combining vectorally to cancel the distortion products.

Referring to FIG. 7 to provide more details of the RF modulator driver circuit 100, a baseband input signal 105 is level set using input attenuator R1. The level to input signal 105 is provided from an external source from a down converted signal. The attenuator R1 assures that any input level is below a point where internal amplifiers can approach a saturation level which generates internal distortion. The input signal 105 is amplified through amplifiers A1, A2 and MAIN LINE amplifier A3 to produce output signals 108a, 108b which are 180 degrees out of phase relative to each other. The output signals 108a, 108b provide the RF input which modulates the optical carrier signal in the external modulation block 24a (FIG. 2A).

Distortion in the RF driver signal is detected by the distortion detector diode D1. A distortion signal is coupled through coupler X1 to the MAIN LINE amplifier A3 with any distortion component 180 degrees out of phase with the signal simultaneously coupled through coupler X1 on the AUX LINE due to voltage variable phase shifter PS. A portion of the signal which has distortion in the MAIN LINE is coupled back through couplers X2, X3 at 180 degrees out of phase and added to the AUX LINE signal. This combined signal is amplified by distortion amplifier A4 and coupled through couplers X5, X4 to the MAIN LINE signal at a 180 degrees phase shift.

Additionally, a tone source 110 is coupled to the RF driver circuit through MAIN LINE amplifier A3 to provide a tone signal for the purpose of detecting distortion in the external modulation block 24a through ratio detector 35a (FIGS. 2A and 3). The tone signal, preferably at a frequency outside the operational bandwidth, e.g., below 50 MHz, is proportional to the RF drive and can generate distortion side bands as described below. An output 38aa from the ratio detector 35a (FIG. 2A) is input to amplifier A2 to correct for any second order distortion. An output 38ab from the ratio detector 35a is input to amplifier A5 to correct the DC bias to the external modulation block 24a such that the quadrature point is maintained. The output of amplifier A5 passes through a lowpass filter F1 and feeds a voltage variable attenuator R2.

The operational amplifiers A5 and A6 form a summing junction for an AGC correction loop. This junction sums an error feed back from the amplifier and optical modulation. The AGC loop which is a second order loop is established through amplifiers A5 and A6 and closed through the phase shifter PS and attenuator R2. The filters F1 and F2 set the loop time constraints establishing noise rejection and time bandwidth products for loop response. The distortion correction and DC bias is maintained through the AGC loop. The DC bias to the amplifier is buffered and scaled through amplifier A7 and fed to the optical modulator to maintain a $\pi/2$ bias condition on the modulation curve.

Figure 8:
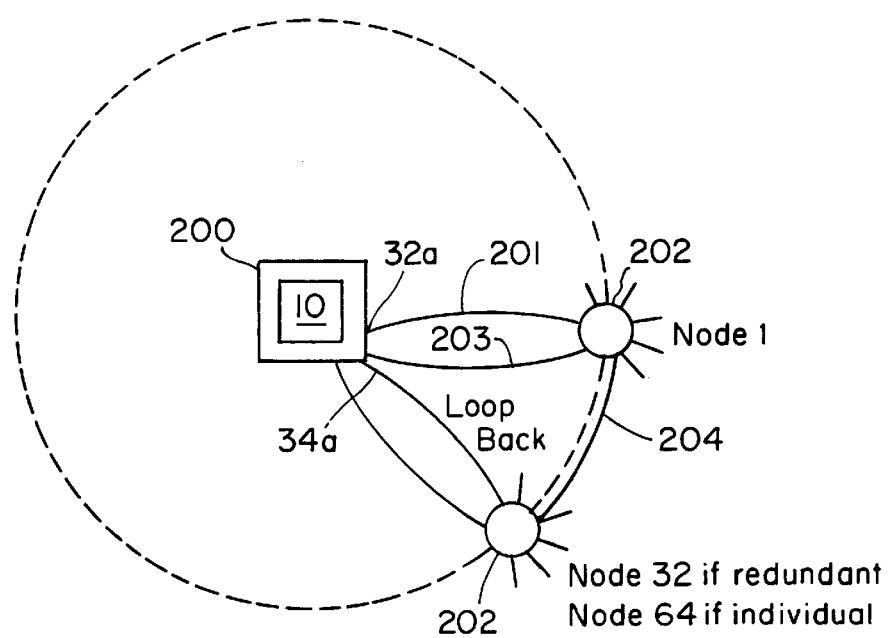
FIG. 8 illustrates a network topology employing the present invention.

The linear multi-output optical transmitter system of the present invention allows a greater number of transmitters to be driven from one high powered laser. Referring to FIG. 8, a layout is illustrated in which the system 10 of the present invention is located at a headend site 200. Each individual modulated transmitter is shown supporting a single node 202 with redundant outputs 32a, 34a over optical fibers 201, 203 respectively. In addition, the nodes 202 can be connected through a daisy chain 204 to provide further redundancy. This redundant configuration increases both network reliability and subscriber bandwidth. Alternatively, the redundant outputs 32a, 34a can each support a single node, thereby increasing the number of subscribers served. In the preferred embodiment, either 32 redundant nodes or 64 individual nodes can thus be supported. With either configuration employing the present invention, service providers can distribute more services over the same cable plant with a transmitter cost that is far less than today's cost.

It is important to note that the scope of the present invention includes embodiments in which the RF modulation can be one of several digital modulation techniques suitable for digital TV transmissions, for example, double sideband quadrature amplitude modulation (QAM) and multi-amplitude vestigial sideband (VSB) modulation. Such digital modulation can be accommodated in the preferred embodiment of FIG. 2A by substituting suitable digital external modulators for the Mach-Zehnder modulators 26a, 28a described herein.

In addition to present communication networks, the transmitter system of the present invention is well-suited to address emerging personal communication networks (PCNs). PCNs are wireless networks which are being configured to operate at 2 and 4 GHz. One method favored for PCN transmission uses a spread spectrum technique whereby a very low power RF signal having a wide frequency range is transmitted. There are significant drawbacks to operating with this scheme. First, the higher carrier frequency (e.g. 2 GHz) cannot penetrate obstructions but is instead absorbed. Thus, PCN transmission is line of sight. Second, spread spectrum requires a wide bandwidth.

Figure 9:
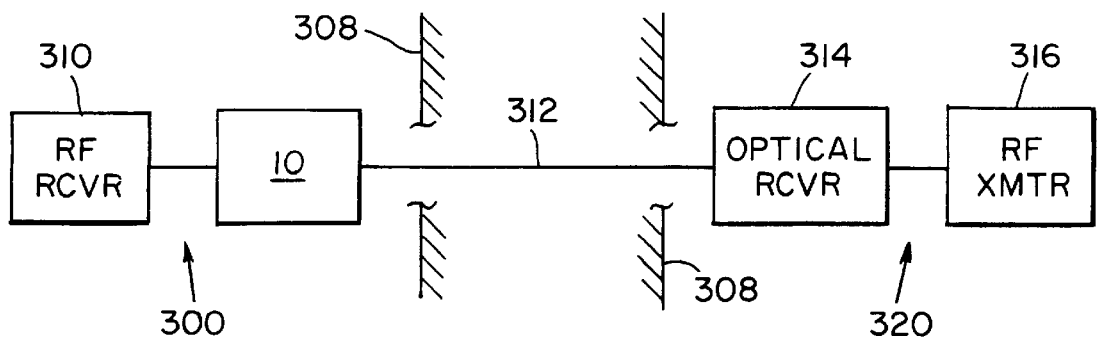
FIG. 9 illustrates the use of the invention in a personal communication network.

The relatively large bandwidth and high frequencies of PCNs are well-suited to the present invention. Referring to FIG. 9, a layout is schematically illustrated in which the system 10 of the present invention is located at a cell site 300. An obstruction 308, e.g., a building, separates cell site 300 from another cell site 320. The multi-octave bandwidth capability of the electronic driver and optical modulator of the system 10 allows direct modulation by an RF input signal from an RF receiver 310. The output from the system 10 can be transported through or around the line of sight obstruction 308 via an optical fiber cable 312 to be received and retransmitted at cell site 320. The signal is received by an optical receiver 314 and retransmitted by RF transmitter 316. An advantage of the present invention in this arrangement is that down conversion and up conversion of the RF signal at the respective cell sites 300, 320 is eliminated.

A significant feature of the transmitter system is its modular packaging. The modularized configuration allows for individual testing of components and ease of access and replacement which enables the system to meet the performance and size constraints required by industry in an operational environment. Specifically, each driver and modulator can be mounted on a common module body. Thus in the preferred embodiment, the total transmitter assembly comprises 32 dual or 64 single transmitters packaged in an area two orders of magnitude smaller than equivalent transmitters existing today. For example, the transmitter assembly can fit in a 14 inch panel while an equivalent transmission system with existing technologies occupies three full 84 inch racks.

As noted above, the transmitter module includes a multi-chip electronic driver and a dual parallel multi-chip modulator. The dual parallel multi-chip modulators can be fabricated on a single substrate of lithium niobate which insures control of the basic phase and propagation delay parameters. Referring again to FIG. 3, the external modulation block 24a is fabricated on a common lithium niobate substrate to form a multi-chip configuration. The dual chip is packaged in either a Kovar or ceramic package having co-efficient of expansion characteristics which are small over the entire environmental range. Line length and width can be controlled to maintain both phase and amplitude which are critical to performance. The Mach-Zehnder modulators 26a and 28a are traveling wave interferometers which offer the advantage of allowing a lower drive voltage, e.g., approximately.+/−1.5 volts into 50 ohms. This in turn reduces the burden on the RF modulator driver circuitry discussed above. The optical modulator and the optical dividers employ similar processing techniques—vapor phase deposition, molecular beam epitaxy, diffusion, and bath metal dry etch. A completed package may include a planar waveguide divider, modulator, and electronic driver configured in an electro-optic multi-chip module.

The driver is formed in a chip mounted on a common teflon glass substrate as a low dielectric carrier. This configuration eliminates differential propagation delay and matches the input and output impedance to the modulators. The multi-chip technique uses unpackaged integrated circuits mounted on a substrate and interconnected by conductors applied using a deposition and photolithography process. The input modulation bandwidth of the lithium niobate optical modulator can be 10 GHz or higher. Providing the RF electrical drive to this device requires traversing several technologies. The low end band requires silicon devices and a teflon glass substrate. Gallium arsenide devices and micro strip transmission lines are used in the higher end. Therefore, one of the keys to achieving performance over the range of frequencies between 5 MHz and 10 GHz is a modularized multi-chip configuration for each range. Another key ingredient is that path length and differential propagation delay are minimized by employing an "embedded chip on carrier" approach. The embedded multi-chip design uses a photolithography process to create exact line width and length which also provides matching structures. The coupler and delay lines in the lower bandwidth configuration made with active silicon components are formed of a lump constant and a low dielectric teflon glass substrate implemented as the carrier.

Figure 10:
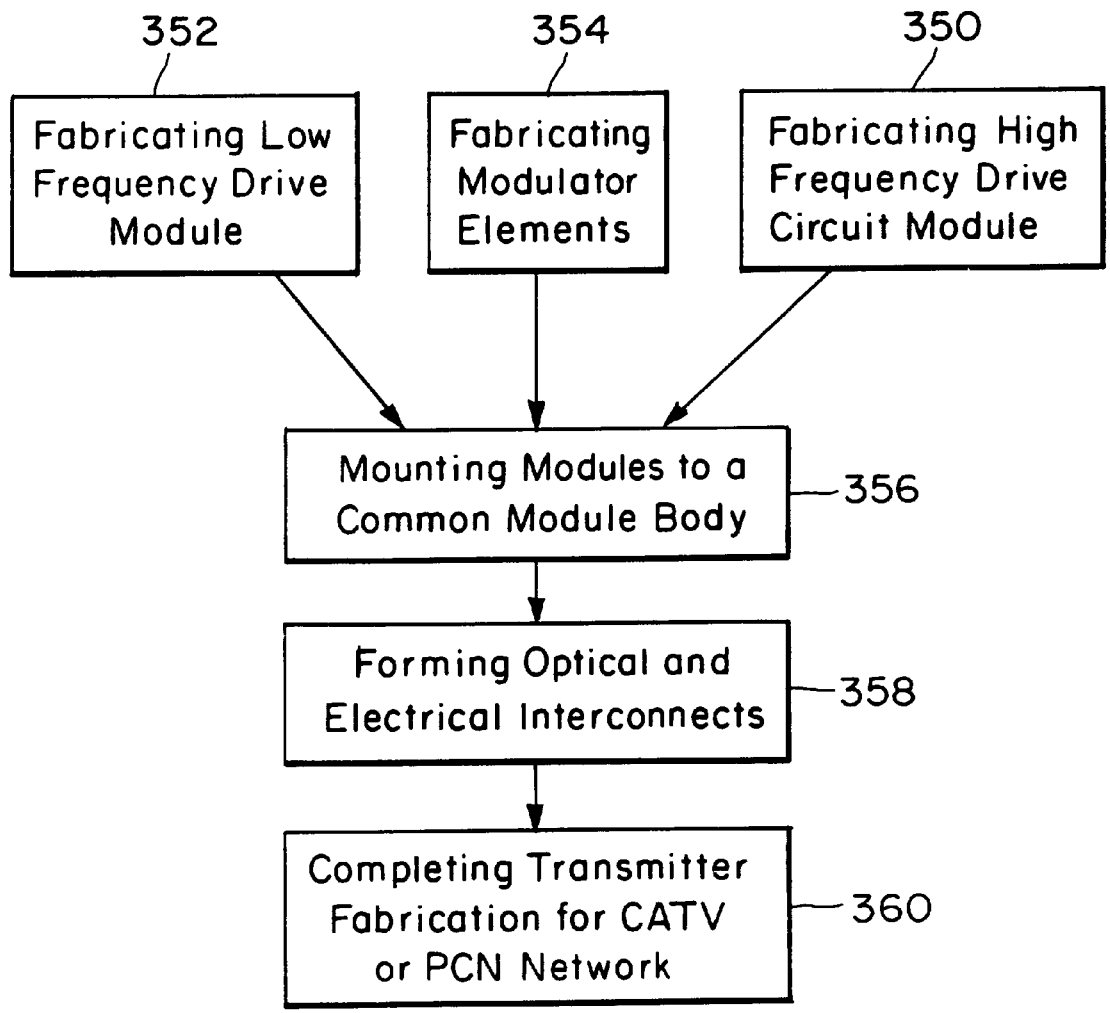
FIG. 10 is a process flow sequence for manufacturing a multi-chip module in accordance with the invention.

FIG. 10 illustrates a process of fabricating a multi-chip module in accordance with the invention. In this particular application, both high 350 and low 352 frequency drivers are separately fabricated on gallium arsenide and silicon wafers respectively. The modulator elements 354 are also separately fabricated and all these elements are mounted on a common module body at 356. Both optical and electrical interconnects are then formed between module elements using selected line width and length parameters to provide improved operational characteristics.

Figure 11:
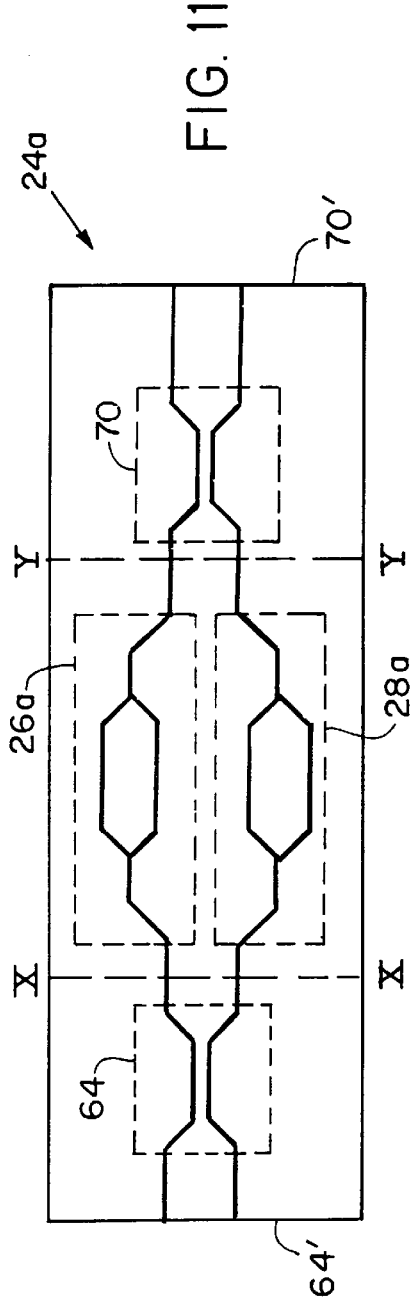
FIG. 11 illustrates the sections of the external modulation block of FIG. 3.

As described herein, the external modulation block 24a of the preferred embodiment shown in FIG. 3 comprises a proportional coupler 64, dual external modulators 26a, 28a and combiner 70 fabricated on a single substrate. To achieve effective linearization using the dual parallel modulation cancellation technique requires precise splitting ratios in the proportional coupler 64 and the combiner 70. A method has been discovered for optimizing these splitting ratios. Initially, the external modulation block 24a is fabricated on a single substrate as shown in FIG. 11. The device is then cut along lines X—X and Y—Y respectively. Line X—X divides the output of coupler 64 and the input to modulators 26a, 28a. Line Y—Y divides the output of modulators 26a, 28a and the input of combiner 70. After cutting the device along these lines, the resulting coupler sections 64', 70' are polished. The coupler sections 64', 70' can then be tested individually, with fine tuning by additional post baking or diffusion as needed to achieve the optimal splitting ratio. The optimized coupler sections 64', 70' are then aligned and reattached to the central modulator section. Note that since the coupler sections were cut from the same original device, the waveguides can be substantially aligned.

Note that for an external modulator the bandwidth and the modulation efficiency as measured by Vπ are inversely related. Therefore, the modulator design should be optimized for the bandwidth of interest. For instance, modulators with bandwidth of 30 Ghz (3 dB electrical bandwidth) with Vπ of 5.0 volts have already been demonstrated. (see for example, 75-Ghz Ti: LiNbO3 optical modulator," K. Noguchi et al., OFC '94 Technical Digest, Paper no. WB3. page 76). Therefore, we have designed a modulator with a bandwidth of 1 GHz for a CATV system with a Vπ of 1 volt. This will result in considerable reduction in RF power and cost of drive electronics. To optimize performance of the system over large bandwidth, the following alternative to the driver of FIG. 6 can also be implemented as shown in FIG. 12.

Figure 12:
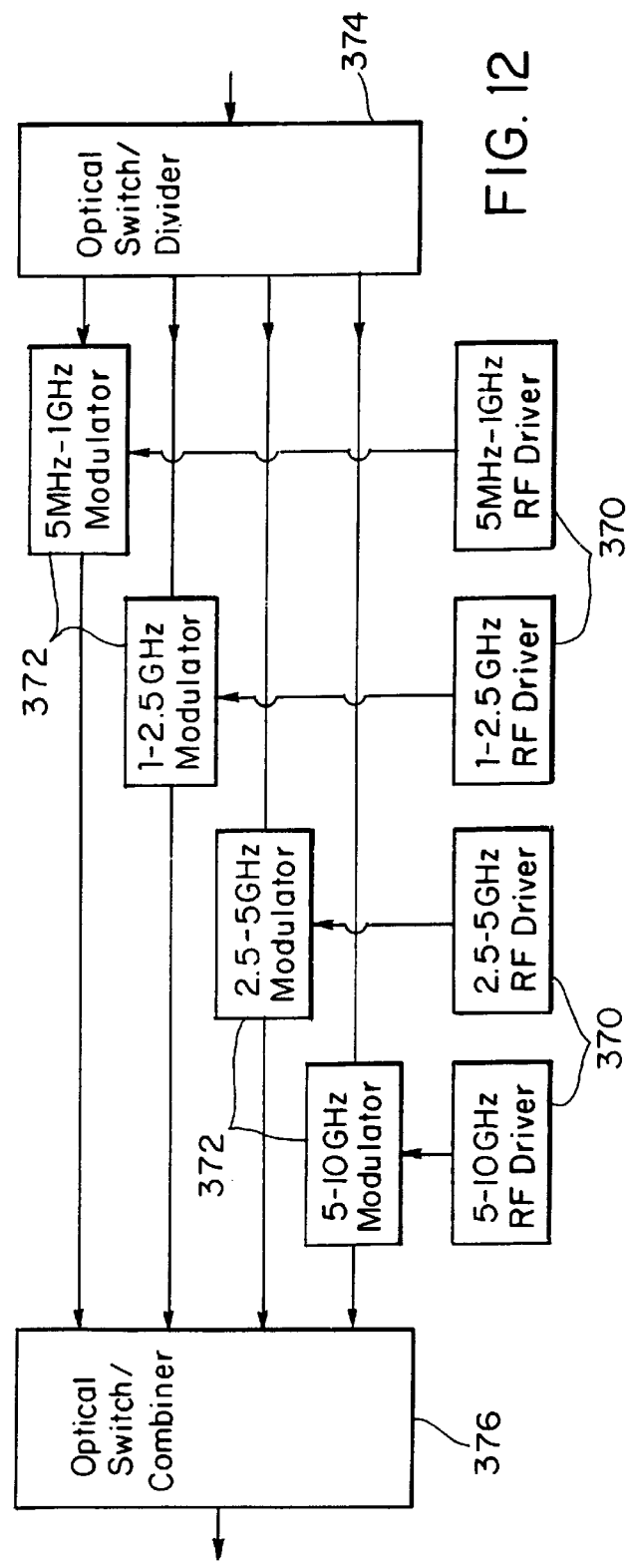
FIG. 12 is a block diagram of an alternate RF modulator driver for the system of FIG. 2A.

In the arrangement shown in FIG. 12, RF modulator driver circuits 370 are coupled to respective optical modulators 372. Instead of combining the RF driver circuit outputs to drive a single modulator as in the first embodiment, in this arrangement the RF drivers 370 individually drive bandwidth optimized modulators 372. The output of the modulators 372 is then combined through optical combiner 376.

Referring to FIGS. 13–16, an alternate embodiment of the invention will now be described. The goal of the preferred embodiments, as noted earlier, is to minimize second and third order distortion products over a wide bandwidth.

Figure 13:
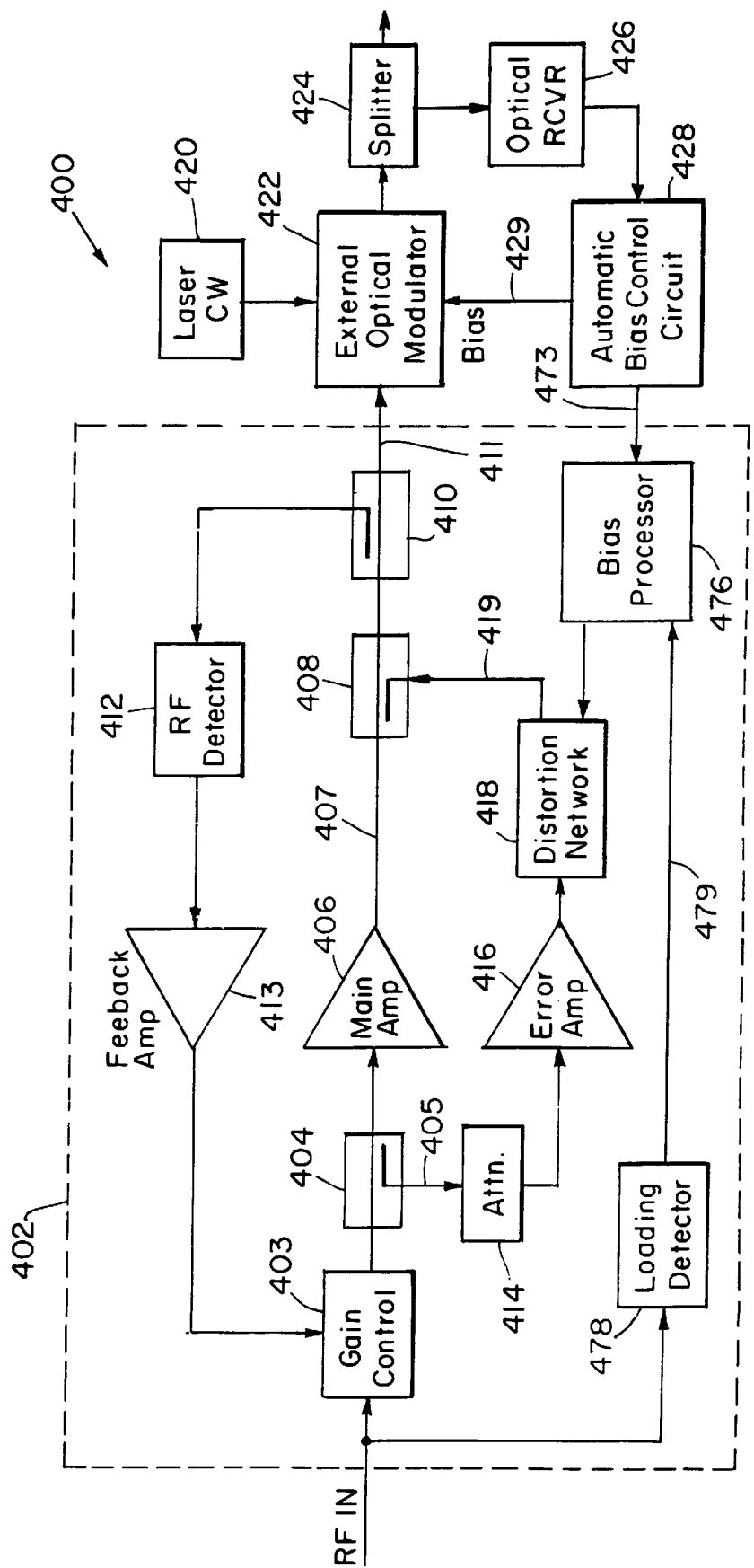
FIG. 13 is a schematic block diagram of another preferred embodiment of the present invention.

The alternate embodiment illustrated in FIG. 13 provides a system 400 comprising a single external optical modulator 422 driven by an electronic driver 402, both of which are bias controlled by an automatic bias control circuit 428. The electronic driver 402 includes a distortion network 418 which performs a predistortion function on the RF input to compensate for third order distortion generated by the modulator 422. A continuous wave (cw) laser source 420 is coupled to the modulator 422, which is preferably a Mach-Zehnder modulator.

The automatic bias control circuit 428 monitors the optical output signal from the modulator 422 and generates bias correction signals to control the distortion network 418 and to maintain the modulator 422 at the quadrature point. The automatic bias control circuit 428 injects a supervisory tone signal on the DC bias electrode 429 of the modulator 422. The frequency of the supervisory tone signal is selected to be below the lower limit of the CATV RF bandwidth, i.e., below 50 MHz.

Referring to FIG. 13, the operation of driver 402 will now be described. An RF input signal is coupled to main amplifier 406. A portion of the output of main amplifier 406 is coupled through a feedback detection circuit comprising RF detector 412 and feedback amplifier 413 which provides a feedback signal to gain control 403 to maintain the RF driver signal 411 at a constant amplitude over the entire RF bandwidth. A sample signal 405 of the RF input signal is applied to a distortion network 418 through attenuator 414 and error amplifier 416. The distortion network 418, described further below, generates odd-order distortion products in signal 419 which compensate for nonlinearities generated by modulator 422. These distortion products are then recombined with the output 407 of the main amplifier 406 by coupler 408 to create a composite signal 411 to drive the modulator 422. The nonlinear modulation of the modulator 422 effectively generates odd-order distortion products of opposite phase to that of the applied composite signal 411. Since the amplitude of the odd-order products generated by the modulator 422 match the amplitude of the distortion products in signal 419, the odd-order distortion of the modulator 422 is effectively cancelled.

A loading detector 478 samples a portion of the RF input signal to provide a measure of the channel loading present in the RF input signal. The loading detector 478 employs active filtering to perform frequency discrimination which is indicative of channel load. A loading detector output signal 479 is coupled to bias processor 476 which processes the signal to yield a coarse bias optimization for the distortion network 418. A fine bias optimization is determined by the bias processor 476 based on a bias optimization signal 473 received from automatic bias control circuit 428 described further herein.

The bias processor 476 can be a single chip micro processor such as a HD6802 MPU manufactured by Hitachi. The bias processor 476 has look up tables (LUTs) stored in memory. The processor accesses the bias LUT based on the channel loading and presets the distortion network 418. The fine bias adjust can be programmed based on the optical receiver sampling of the odd order distortion providing an iterative process either in a Monte Carlo or least square process to minimize the distortion with adjustment of the bias on the individual diode. The bias processor can also be used in the event of any asymmetry to fine tune the modulator quadrature point.

Figure 14:
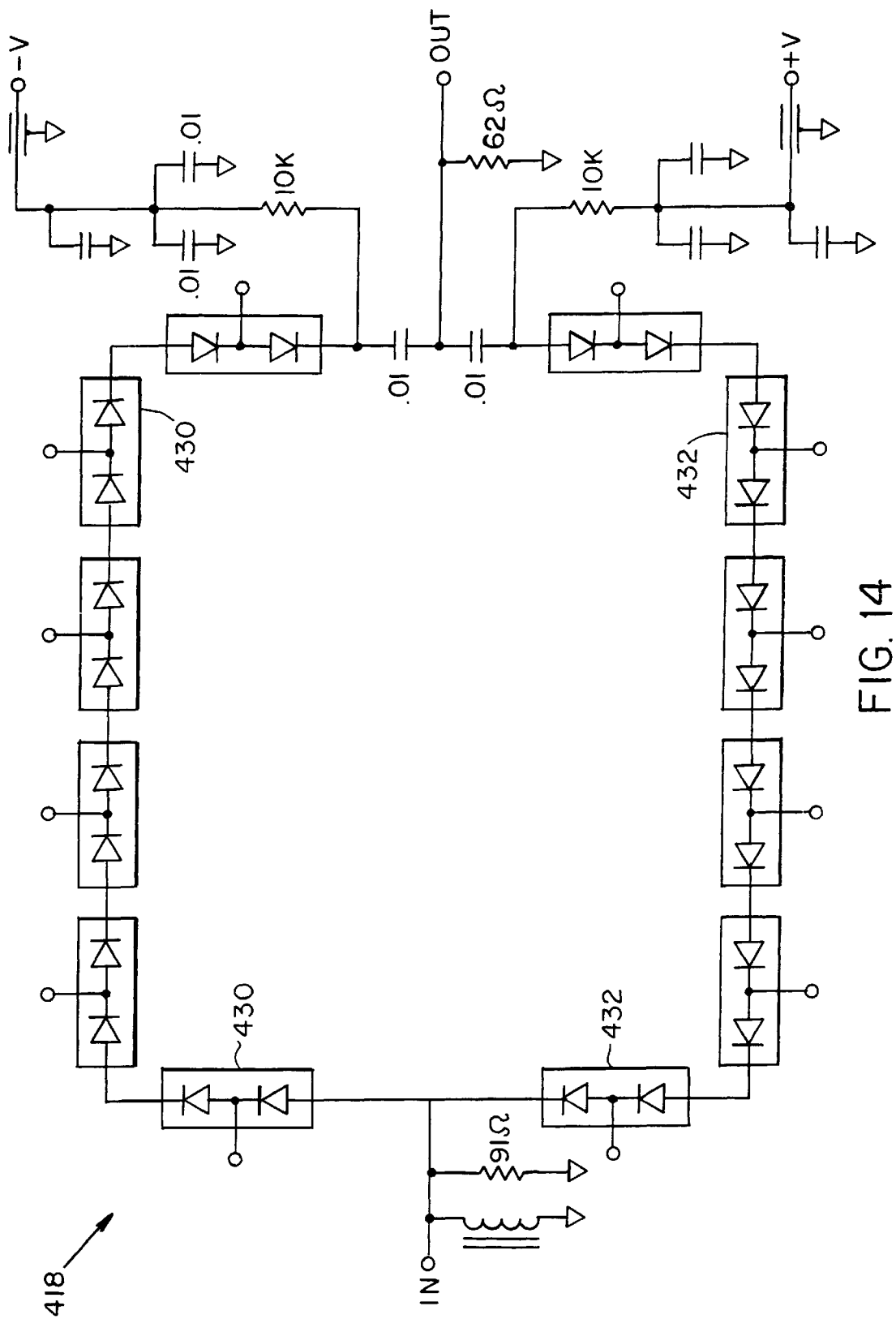
FIG. 14 is a schematic circuit diagram of a parallel diode configuration for use as the distortion network of FIG. 13.
Figure 15:
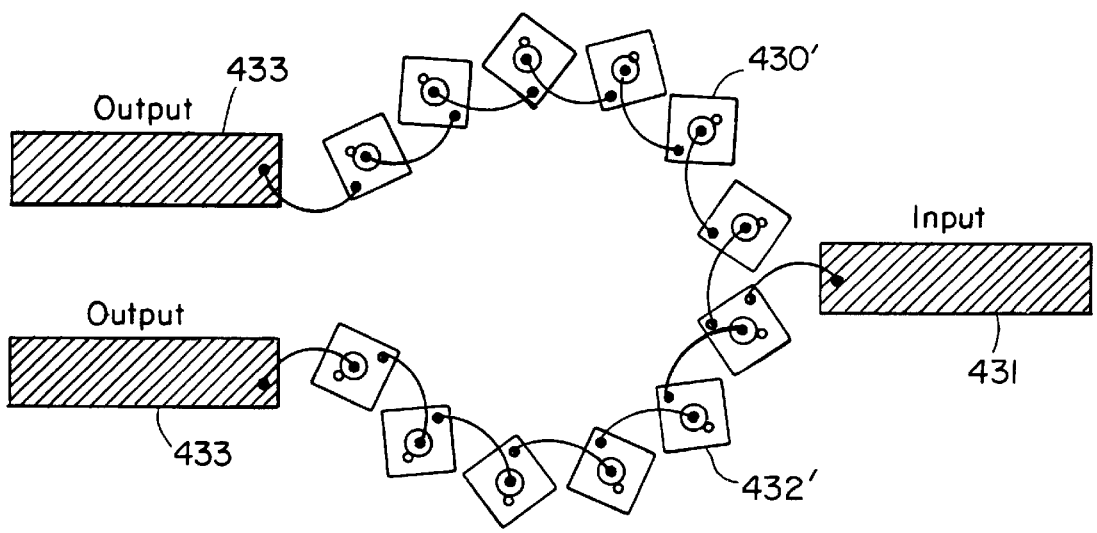
FIG. 15 illustrates a configuration of a multi-chip diode layout for use in the distortion network of FIG. 13.

Referring to FIG. 14, a parallel diode configuration for use in the distortion network 418 is shown. It has been recognized that an inverse sine function which compensates for the nonlinearity of the modulator 422 can be approximated from a diode. The diode configuration of FIG. 13 is a preferred arrangement. The distortion network 418 comprises a first series of diodes 430 coupled in anti-parallel fashion to a second series of diodes 432. The diode series 430, 432 are forward biased through voltage sources V− and V+ respectively. Though twelve diodes are shown in each diode series, the actual number of diodes is likely to range from 2 to 12 diodes, depending upon the size of the desired $V_o$, where $V_o$ is the amplitude of distortion products in distortion network 418 and is proportional to channel loading and the modulation index.

The treatment for utilizing diodes to generate nonlinear products was reported in "Theory of Nonlinear Distortion Produced in a Semiconductor Diode", K. V. Lotsch, IEEE Transactions on Electron Devices, May, 1968. Lotsch's treatment define the small signal approximations and provides universal curves for these distortions. To provide an implementation, one must take into account the amount of distortion correction required. Therefore, general aspects must be considered: 1) providing extremely low group delay in the circuit; 2) minimizing the amplitude to phase conversion (AM to PM); 3) compensating for the effects of channel loading and modulation index versus amplitude of distortion.

The group delay and AM to PM conversion have been addressed by the packaging techniques utilized by the diode layout to minimize reactive components. The effects of channel loading are handled by the number of diodes. The key is to generate the distortion amplitude required by the channel loading while matching the small signal characteristics of each diode. This is resolved by the number of diodes and the biasing technique using a bias processor to set the level as needed for each diode. To minimize parasitics, diode arrays such as the HSMS-2812 Schottky Series Diode devices manufactured by Hewlett Packard are preferred as shown in the multi-chip diode configuration of FIG. 15. In this configuration, a first series of six diode devices 430' are coupled in anti-parallel fashion to a second series of diodes 432'. Input electrode 431 and output electrodes 433 are metal striplines fabricated on an alumina substrate.

Figure 16:
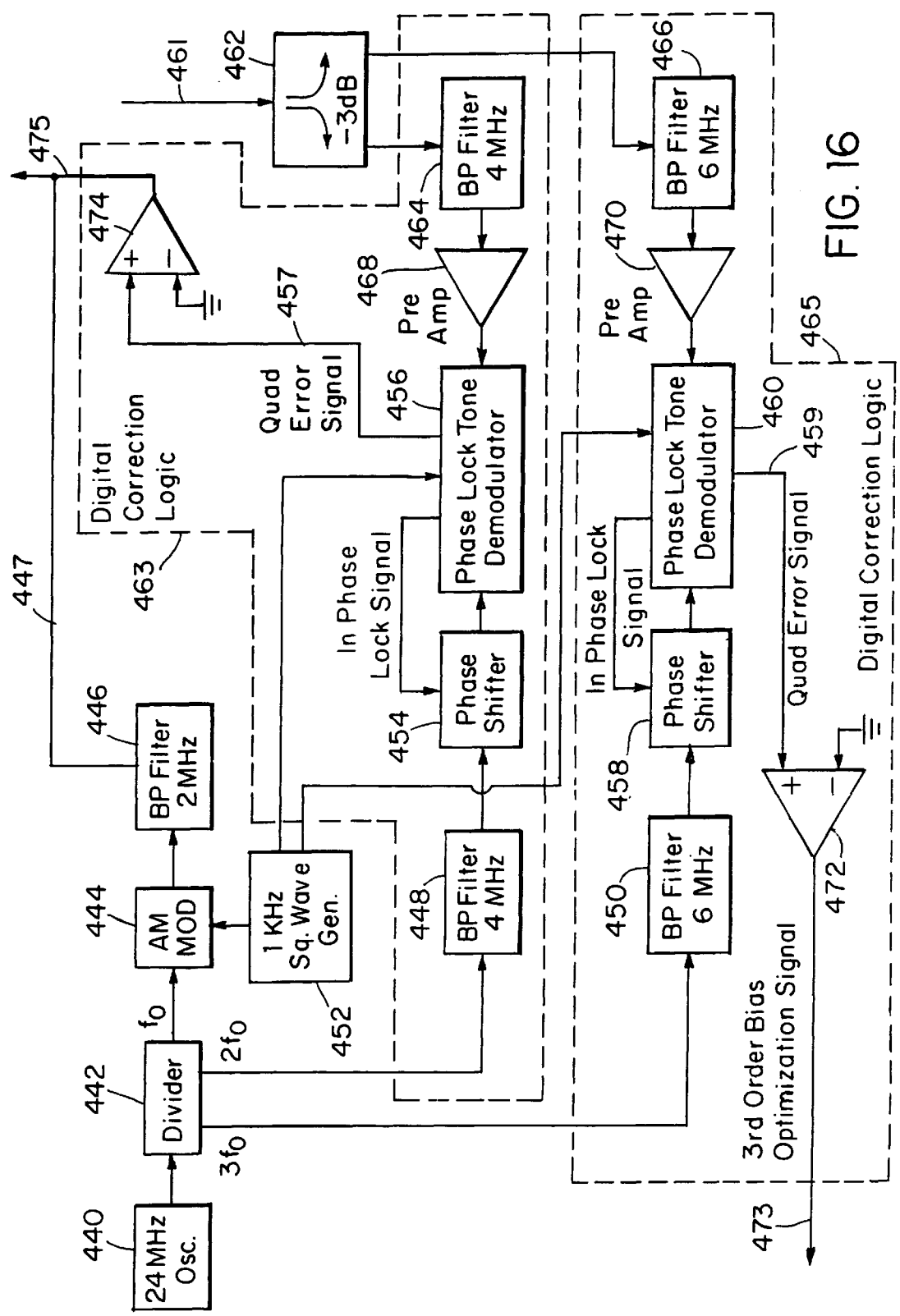
FIG. 16 is a schematic block diagram of an automatic bias control circuit for use in the embodiment of FIG. 13.

Referring to FIG. 16, the automatic bias control circuit 428 is illustrated. The supervisory tone signal 447 is generated by a 24 MHz oscillator 440, the output of which is divided down by divider 442 to a 2 MHz carrier signal $f_o$ and to 4 and 6 MHz reference signals $2f_o$, $3f_o$ respectively. A 1 KHz square wave signal produced by square wave generator 452 modulates the 2 MHz carrier signal in AM modulator 444 and the modulated output is filtered by bandpass filter 446 to yield the supervisory tone signal 447. As noted earlier, the supervisory tone signal 447 is injected on the DC bias input of the external optical modulator 422 (FIG. 13). It has been found that injecting the supervisory tone signal 447 on the DC bias input instead of mixing the signal with the RF input 411 (FIG. 13) provides better isolation and thus reduces unwanted intermodulation products generated by cross modulation between the two signals.

The predistortion linearization technique utilizes a nonlinear device which generates distortion products that are equal in amplitude and opposite in phase of the non-linear products generated by the optical modulator. The complementary distortion products in the CATV application are dependent on the optical modulation index and channel loading. The modulation index is a percentage of modulation on the carrier and is proportional to the scale factored drive voltage on the optical modulator. The voltage traverses an angular portion of the non-linear sine curve, i.e., the greater the loading the greater the angle subtended on the curve. Monitoring the channel loading and adjusting the bias to the predistortion network with the bias processor 476 optimizes the day-to-day and installation-to-installation handling.

A monitor signal 461 containing distortion products generated by the modulator 422 is output from optical receiver 426 (FIG. 13) and split by RF splitter 462 to form inputs to even-order correction circuit 463 and odd-order correction circuit 465 both of which correct intermodulation distortion on the basis of quadrature detection of the distorted supervisory pilot signal 447. The correction circuits 463, 465 do not use the out of phase control suggested by other bias control schemes.

The correction circuits 463, 465 comprise identical elements, differing only on the passband of interest. The operation of the even-order correction circuit 463 will now be described further. A portion of the monitor signal is filtered through bandpass filter 464 around the passband containing second order distortion products, which for a supervisory tone signal at 2 MHz would be a passband centered around 4 MHz. For the odd-order correction circuit 465, the passband is centered around 6 MHz.

The filtered monitor signal is fed through preamp 468 to a phase lock tone demodulator 456 which in conjunction with phase shifter 454 performs a phase lock loop detection function on the monitor signal to produce a quad error signal 457. The quad error signal 457 is input to digital correction logic 474 to produce bias control signal 475 which is input to the DC bias input of the modulator 422.

Odd-order correction circuit 465 includes a phase lock tone demodulator 460 which produces a quad error signal 459. The error signal 459 is input to digital correction logic 472 to yield third order bias optimization signal 473 which is coupled to bias processor 476 (FIG. 13) for adjusting fine bias of the distortion network 418.

The quadrature phase lock loop of correction circuit 463 senses and maintains the bias applied to the DC bias input of the optical modulator 422 for minimizing second order products. The quadrature phase lock loop of correction circuit 465 senses and maintains the bias to the distortion network 418. The dynamic bias control provides for adjustment of the distortion network 418 as the information bandwidth expands. For example, consider an application of the alternate embodiment 400 in a CATV system, in which a CATV provider initially operates over a bandwidth from 50 MHz to 450 MHz with 60 analog channels. An expansion to a bandwidth of, for example, 50 MHz to 1 GHz generates a different set of distortion products in the modulator 422. The dynamic bias control provided by the automatic bias control circuit 428 in conjunction with bias processor 476 (FIG. 13) automatically adjusts the bias of the distortion network 418 to linearize the RF input signal over the bandwidth.

In a preferred mode of operation, the quadrature point of the modulator 422 is maintained at $V\pi/2$ such that the linear region of the modulator transfer function has a positive slope as shown in FIG. 5.

The RF match of the optical modulator 422 is flat both in amplitude and phase with a return loss of −20 dB allowing for broadband operation with minimal group delay.

It should be noted that the alternate embodiment of FIG. 13 can be used with components of other embodiments, e.g., the driver/modulator configuration of FIG. 13 can be substituted for the transmitter 22a in FIG. 2A.

Figure 17A:
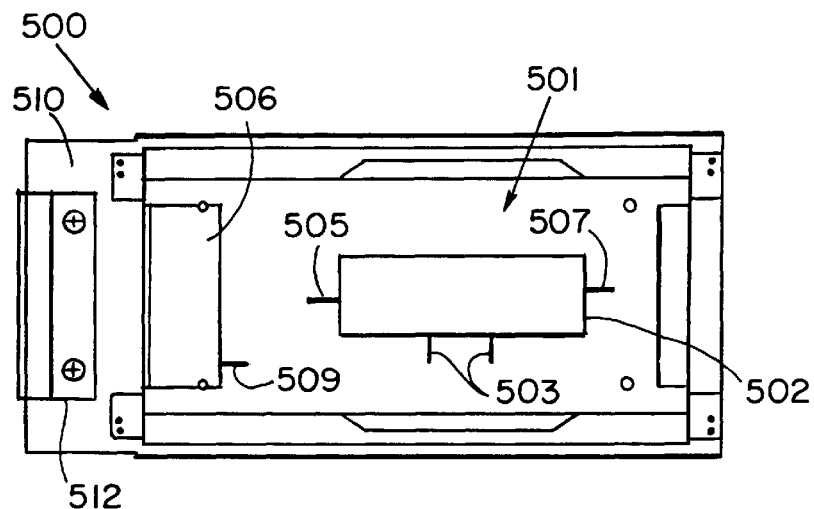
FIG. 17a is a top view of a rack mountable module embodying the present invention.
Figure 17B:
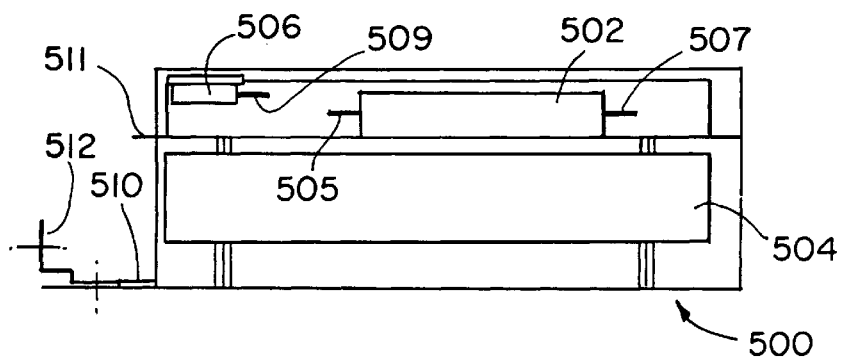
Figure 18:
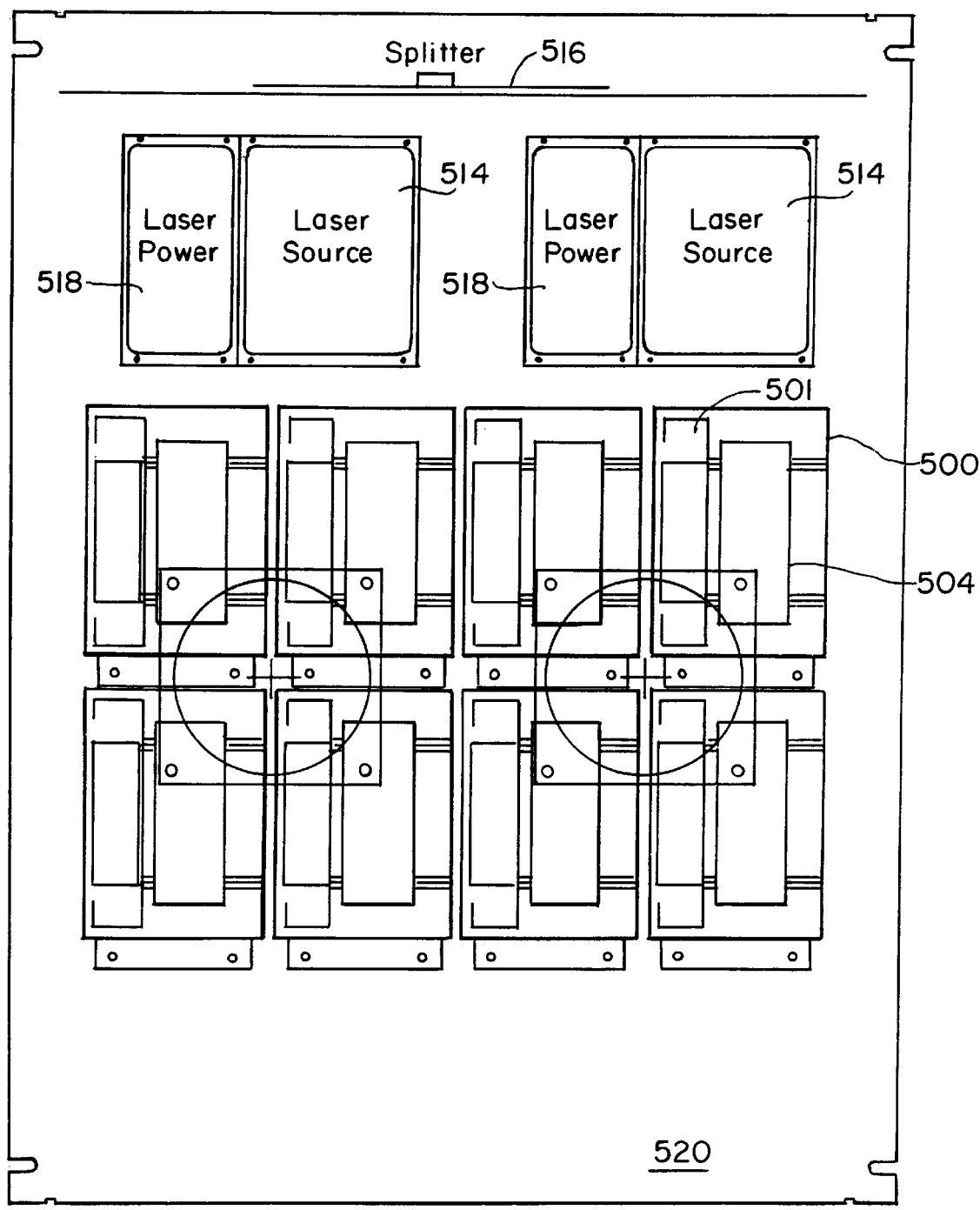
FIG. 18 is a front view of a system configuration embodying the present invention.

Referring to FIGS. 17a, 17b and 18, a system configuration embodying the present invention will now be described. A rack mountable module 500 is illustrated in the side and front views of FIGS. 17a and 17b respectively. The module 500 includes an external optical modulator subassembly 501 and an electronic driver package 504. The optical modulator subassembly 501 incorporates a modulator 502 of the type disclosed in the other embodiments of the invention and further includes an optical receiver 506. Similarly, the driver package 504 incorporates an electronic driver of the type described in the other embodiments. The modulator 502 includes optical input and output ports 505, 507 respectively and driver electrodes 503. The driver package 504 and the modulator subassembly 501 are both mounted to a common plate 511. A faceplate 510 mounted to the module includes a handle 512 to facilitate rack mounting of the module in a system configuration as shown in FIG. 18.

The system configuration of FIG. 18 further incorporates components of the present invention including dual laser sources 514, dual laser power supplies 518, splitter 516, and eight modulator/driver modules 500 configured to mount to a 14 inch ×26 inch mounting panel or housing 520. As described above in relation to the other embodiments, in this configuration, laser source 514 is a cw YAG laser which is split by 8:1 splitter 516. An individual output of splitter 516 is coupled to each modulator/driver module 500. The configuration of FIG. 18 illustrates the high density packaging possible with the present invention.

Figure 19:
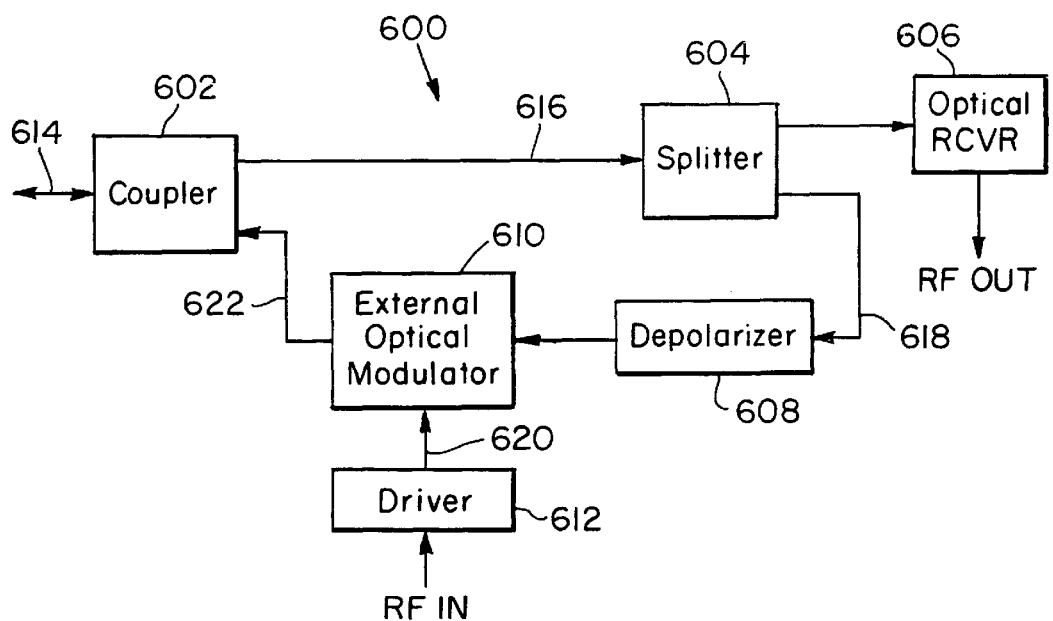
FIG. 19 illustrates the use of the invention in a CATV network for upstream transmission.

The transmitter system of the present invention is well-suited to address remote modulator configurations for use in emerging CATV architectures. FIG. 19 illustrates a remote modulator configuration, also referred to as "echo back", which provides upstream transmission capability for such services as telephony, internet access and video.

At a fiber node 600, a fiber optic cable 614 transmitting a downstream signal 616 from a remote transmitter is coupled to a conventional optical receiver 606 which produces an RF output. A portion 618 of the downstream signal 616 is split by splitter 604 and coupled to the optical input of external optical modulator 610. A depolarizer 608 coupled between the splitter 604 and modulator 610 depolarizes the signal 618 to enhance the modulation operation of modulator 610. A driver 612 drives the modulator 610 with an RF driver signal 620 based on an RF input at the node 600. The output of modulator 610 is then coupled to fiber optic cable 614 through coupler 602 for upstream transmission of the modulated carrier signal 622. Alternatively, the output of modulator 610 can be coupled to a separate upstream fiber optic cable. The upstream transmission for the configuration of FIG. 19 uses a 5 MHz–40 MHz passband. Other passbands can be used including a passband above the downstream passband.

In fiber optical communication applications such as described above for CATV, telephony, cellular, and PCS, suppression of Stimulated Brillouin Scattering (SBS) is desirable. A solid state laser capable of operating with several longitudinal modes to suppress SBS is disclosed in U.S. Pat. No. 5,461,637, the entire contents of which are incorporated herein by reference. Such a semiconductor laser, or other laser system producing a plurality of wavelengths, either electrically or optically pumped, can be provided as the laser source 12 in the system 10 described herein with an output power of at least 100 mW and preferably in excess of 200 mW. The laser source 12 can instead be a MicraChip® Nd:YAG CW laser source, such as model number MC-HM-12-00-FONS, manufactured by Micracor, Inc.

Figure 20:
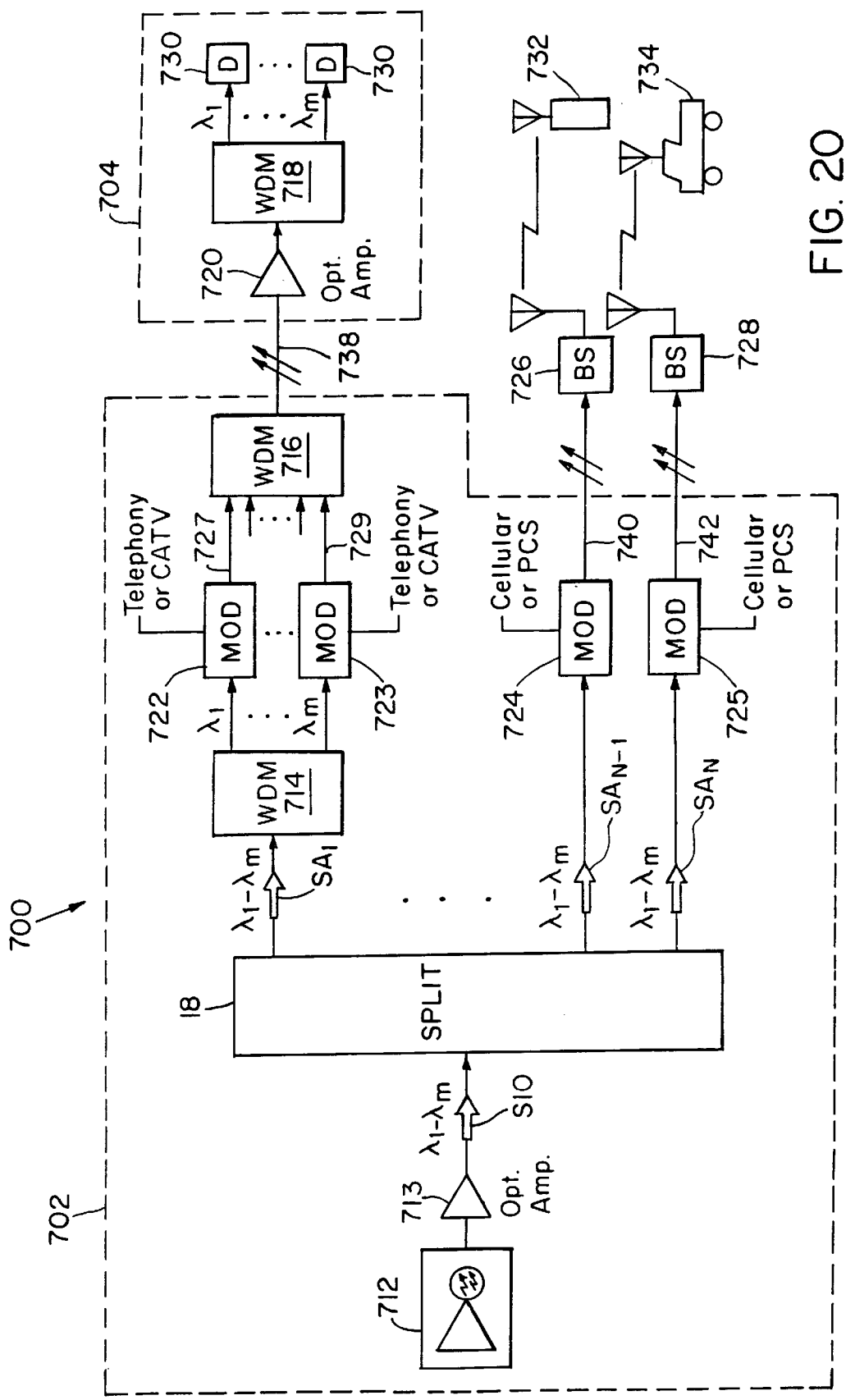
FIG. 20 is a block diagram of an embodiment wherein multiple wavelengths provided by a multimode laser source are separately modulated.

In another embodiment shown in FIG. 20, a system 700 is provided which takes advantage of the multimode operation of a solid state laser described above to provide at least two wavelengths which can be separately modulated using the external modulation system detailed above to provide multiple communication services. The system 700 includes at a central site 702, a laser source 712, an optical amplifier 713, a splitter 18, wavelength division multiplexers (WDMs) 714 and 716, and external modulators 722, 723, 724 and 725. Remote from the central site 702 are an optical amplifier 720, a WDM 718, optical detectors 730, radio base stations 726, 728, wireless terminal 732 and mobile unit 734.

The output of laser source 712, nominally 100–300 mW, is amplified by optical amplifier 713 to provide optical signal S10. The optical amplifier 713 can be a Praseodymium doped fluoride fiber gain module, such as the Fluorolase® Fiber Gain Module manufactured by Galileo Electro-Optics Corporation, a Raman amplifier, or any other suitable gain module. The laser source 712 in multimode operation provides an optical signal S10 having multiple longitudinal modes at wavelengths $\lambda_1$–$\lambda_m$. The number of modes provided depends on the geometry of the laser and can be, for example, 4, 8 or 16 modes. Having a number of modes in the range of 4–8 is preferred. In one embodiment, the wavelength is nominally 1319 nm with spacing on the order of 1 Å. A 1×N splitter 18 coupled to the optical amplifier 713 splits the optical signal S10 to N outputs $SA_1$ to $SA_N$. Output $SA_1$ is coupled to a WDM 714 which divides the optical signal according to its constituent wavelengths $\lambda_1$–$\lambda_m$ to separate the wavelengths at the m outputs. The outputs of WDM 714 are coupled to external modulators 722, 723. Outputs $SA_{N-1}$, $SA_N$ from splitter 18 are coupled to external modulators 724, 725 respectively.

The WDMs are of the type which can operate on densely spaced wavelengths. U.S. Pat. No. 4,715,027, incorporated herein by reference, discloses an echelon grating device suitable for handling channel separations on the order of 1 Å. Alternatively, the WDMs can be of the ring resonator type.

External modulator 722 receives an optical carrier signal at wavelength $\lambda_1$ from WDM 714 and modulates the carrier signal with an RF information signal such as a CATV or telephony signal to provide a modulated output signal 727. External modulator 723 similarly operates on an optical carrier signal at wavelength $\lambda_m$ to provide a modulated output signal 729. The modulated output signals 727, 729 are coupled to WDM 716 along with modulated output signals associated with the other respective wavelengths output from WDM 714 to provide a wavelength division multiplexed optical signal carried on a fiber optical link 738 to a remote subscriber location 704. At subscriber location 704, an optical amplifier 720 amplifies the optical signal received on link 738. A WDM 718 coupled to the output of the optical amplifier 720 demultiplexes the combined optical signal. The demultiplexed optical signals at wavelengths $\lambda_1$–$\lambda_m$ are then detected separately by detectors 730. By this approach of modulating separate wavelengths, a subscriber location can be provided with multiple services from a single laser source over a single fiber.

External modulator 724 receives an optical carrier signal $SA_{N-1}$ from splitter 18 and modulates the carrier signal with an RF information signal such as a cellular or personal communications services (PCS) signal to provide a modulated output signal 740. External modulator 725 in a similar manner operates on an optical carrier signal SAN to provide a modulated output signal 742. The modulated output signals 740, 742 are carried on fiber optical links to individual radio base stations 726, 728 respectively at locations remote from central site 702. The base stations include optical detectors which convert the optical signals to RF signals for transmission to wireless terminal 732 and mobile unit 734. It should be noted that for upstream transmission of information signals from remote base stations 726, 728 and from the subscriber location 704 towards central site 702, the embodiment illustrated in FIG. 19 can be used.

Conventional transmission practice dictates down conversion of the information signal from an RF carrier frequency to an intermediate frequency (IF) before electro/optical conversion occurs in the central site 702. The down conversion process limits the bandwidth and creates a non-coherent transmission scheme. Down conversion also adds system noise that inhibits spread spectrum transmission which requires recorrelation of the signal from signal noise. The system of the present invention avoids the need to down convert and instead allows the RF information signal to be directly converted to an optical signal through external modulators.

In other embodiments of the system 700, the laser source can be the MicraChip laser model MC-HM-12-00-FONS which provides 4 or more longitudinal modes. The laser source can instead operate at a nominal 1550 nm in which case Erbium doped amplifiers can be used for the optical amplifiers 713, 720.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An optical transmission system comprising:
   a laser source that produces an optical carrier signal;
   an optical splitter having an input coupled to the laser that splits the optical carrier signal into a plurality of split carrier signals wherein the optical splitter comprises a plurality of twisted pneumatic liquid crystal polarizers for splitting the optical carrier signal into a plurality of split carrier signals having unequal power levels;
   a transmitter coupled to a splitter output and comprising:
      a modulator driver for producing a driver signal; and
      an external modulator having a driver input for receiving the driver signal, and an optical input for receiving a split carrier signal, the modulator modulating the split carrier signal with the driver signal to produce a modulated output signal;
      a distortion correction subsystem that corrects for distortion of the split carrier signal by the external modulator; and
   a fiber optic transmission system coupled to the transmitter that receives the modulated output signal.

2. The system of claim 1 further comprising a second laser source optically coupled to the optical splitter.

3. The system of claim 1 further comprising an optical amplifier coupled between the laser source and the optical splitter and wherein the laser source is a Nd:YAG laser having an output power of at least 50 mW.

4. The system-of claim 1 wherein the distortion correction subsystem comprises a distortion network coupled to the driver signal input for providing nonlinear pre-distortion of the driver signal having a plurality of pairs of diodes connected in an anti-parallel circuit.

5. The system of claim 4 wherein the modulator further comprises a bias input that adjusts a bias point of the modulator and the distortion correction subsystem further comprises a monitoring optical receiver that receives the modulated output signal, a bias control circuit coupled to the monitoring optical receiver and the external modulator, and a bias processor coupled to the distortion network and the bias control circuit.

6. The system of claim 5 wherein the distortion correction subsystem further comprises:
   a first correction circuit coupled to the monitoring optical receiver that generates a first error signal indicative of even order distortion in the external modulator, the first error signal being coupled to the modulator bias input to maintain bias about a bias point; and
   a second correction circuit coupled to the monitoring optical receiver that generates a second error signal indicative of odd order distortion in the external modulator, the second error signal being coupled to the bias processor for adjusting the nonlinear distortion of the distortion network such that distortion products in the modulated optical signal are reduced.

7. The system of claim 1 further comprising a plurality of common module bodies, each module having an external modulator and a modulator driver mounted thereon.

8. The system of claim 1 wherein the external modulator is a Mach-Zehnder modulator.

9. The system of claim 1 wherein the driver signal comprises a cellular RF signal and wherein the fiber optic transmission system is coupled to a cellular base station at a remote location.

10. The system of claim 1 wherein the optical splitter is a 1×32 splitter.

11. An optical transmission system comprising:
   a laser source that produces an optical carrier signal;
   an optical splitter having an input coupled to the laser that splits the optical carrier signal into a plurality of split carrier signals;
   a transmitter coupled to a splitter output and comprising:
      a modulator driver for producing a driver signal; and
      an external modulator having a driver input for receiving the driver signal, and an optical input for receiving a split carrier signal the modulator modulating the split carrier signal with the driver signal to produce a modulated output signal:
   a distortion correction subsystem that corrects for distortion of the split carrier signal by the external modulator;
   a fiber optic transmission system coupled to the transmitter that receives the modulated output signal;
   a wireless signal receiver at a first site for receiving a first driver signal coupled to the modulator driver;
   an optical receiver at a second site for converting the modulated output signal received from the fiber optic transmission system into a second driver signal; and
   a wireless transmitter at the second site coupled to the optical receiver for transmitting the second driver signal.

12. The system of claim 11 wherein the system comprises a personal communication network.

13. The system of claim 11 wherein the receiver is an RF receiver and the transmitter is an RF transmitter.

14. A method of optical transmission comprising the steps of:
   providing a plurality of RF driver signals;
   providing an optical carrier signal;
   splitting the optical carrier signal to a plurality of split carrier signals having unequal power levels; and
   for each split carrier signal:
      modulating the split carrier signal with an RF driver signal to produce a modulated optical signal;
      correcting for distortion of the split carrier signal; and
      coupling the modulated optical signal to a fiber optic transmission system.

15. The method of claim 14 wherein the step of modulating is performed by Mach-Zehnder modulators.

16. An optical transmission system comprising:
   a laser source that produces an optical carrier signal;
   an optical splitter having an input coupled to the laser that splits the optical carrier signal into a plurality of split carrier signals;
   a transmitter coupled to a splitter output and comprising:
      a modulator driver for producing a driver signal; and
      an external modulator having a driver input for receiving the driver signal, and an optical input for receiving a split carrier signal, the modulator modulating the split carrier signal with the driver signal to produce a modulated output signal;
   a distortion correction subsystem that corrects for distortion of the split carrier signal by the external modulator; and
   a fiber optic transmission system coupled to the transmitter that receives the modulated output signal wherein the laser source produces a multimode optical carrier signal having N longitudinal modes, each mode at a different wavelength such that each split carrier signal is multimode, and wherein the system further comprises at least one wavelength division multiplexer coupled to a splitter output for demultiplexing a multimode split carrier signal to N individual wavelength split carrier signals.

17. A method of optical transmission comprising the steps of:
   providing a plurality of RF driver signals;
   providing an optical carrier signal;
   splitting the optical carrier signal to a plurality of split carrier signals; and
   for each split carrier signal:
      modulating the split carrier signal with an RF driver signal to produce a modulated optical signal;
      correcting for distortion of the split carrier signal; and
      coupling the modulated optical signal to a fiber optic transmission system wherein the step of providing an optical carrier signal includes providing a multimode optical carrier signal having N longitudinal modes, each mode at a different wavelength such that each split carrier signal is multimode.

18. The method of claim 17 further comprising demultiplexing at least one multimode split carrier signal to N individual wavelength split carrier signals.

* * * * *